US012367814B2

(12) United States Patent
Lim et al.

(10) Patent No.: US 12,367,814 B2
(45) Date of Patent: Jul. 22, 2025

(54) DISPLAY DEVICE CAPABLE OF ADJUSTING AT LEAST ONE OF REFERENCE VOLTAGE AND INITIALIZATION VOLTAGE ACCORDING TO BRIGHTNESS VALUE

(71) Applicant: Samsung Display Co., LTD., Yongin-si (KR)

(72) Inventors: Hansin Lim, Yongin-si (KR); Seung-Kyu Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/517,101

(22) Filed: Nov. 22, 2023

(65) Prior Publication Data

US 2024/0331616 A1 Oct. 3, 2024

(30) Foreign Application Priority Data

Mar. 30, 2023 (KR) ........................ 10-2023-0041755
May 2, 2023 (KR) ........................ 10-2023-0056970

(51) Int. Cl.
*G09G 3/32* (2016.01)

(52) U.S. Cl.
CPC ....... *G09G 3/32* (2013.01); *G09G 2300/0819* (2013.01); *G09G 2300/0852* (2013.01); *G09G 2300/0861* (2013.01); *G09G 2310/08* (2013.01); *G09G 2320/041* (2013.01); *G09G 2320/045* (2013.01); *G09G 2320/0626* (2013.01)

(58) Field of Classification Search
CPC .............................................. G09G 2320/0626
See application file for complete search history.

(56) References Cited

U.S. PATENT DOCUMENTS

2015/0364089 A1* 12/2015 Pyo ...................... G09G 3/3258
345/77
2017/0186375 A1* 6/2017 Jung .................... G09G 3/3233

FOREIGN PATENT DOCUMENTS

KR 10-2015-0142830 12/2015
KR 10-2017-0078916 7/2017
KR 10-2019-0064200 6/2019
KR 10-2021-0007508 1/2021

* cited by examiner

*Primary Examiner* — Gustavo Polo
(74) *Attorney, Agent, or Firm* — KILE PARK REED & HOUTTEMAN PLLC

(57) ABSTRACT

A display device includes a display panel including a pixel, and a panel driver configured to receive a brightness value, and to generate a reference voltage and an initialization voltage. The pixel includes a driving transistor, a storage capacitor and a light emitting element. In an initialization period, the reference voltage is applied to a gate of the driving transistor, and the initialization voltage is applied to a source of the driving transistor. In a compensation period, the driving transistor is turned on based on the reference voltage such that a threshold voltage of the driving transistor is stored between first and second electrodes of the storage capacitor. The panel driver adjusts at least one of the reference voltage and the initialization voltage according to the brightness value.

20 Claims, 23 Drawing Sheets

INIP 500

FIG. 5

| DBV | VREF | VINT |
|---|---|---|
| 1680 nit | DVREF | DVINT |
| 1000 nit | DVREF | DVINT |
| 600 nit | DVREF | DVINT |
| 300 nit | DVREF | DVINT |
| 100 nit (REF_DBV) | DVREF | DVINT |
| 80 nit | DVREF+△V1 | DVINT+△V2 |
| 60 nit | DVREF+2*△V1 | DVINT+2*△V2 |
| 30 nit | DVREF+3*△V1 | DVINT+3*△V2 |
| 10 nit | DVREF+4*△V1 | DVINT+4*△V2 |
| 7 nit | DVREF+5*△V1 | DVINT+5*△V2 |
| 4 nit | DVREF+6*△V1 | DVINT+6*△V2 |

FIG. 9

| DBV | VREF | VINT |
|---|---|---|
| 1680 nit | DVREF | DVINT |
| 1000 nit | DVREF+△V1 | DVINT+△V2 |
| 600 nit | DVREF+2*△V1 | DVINT+2*△V2 |
| 300 nit | DVREF+3*△V1 | DVINT+3*△V2 |
| 100 nit | DVREF+4*△V1 | DVINT+4*△V2 |
| 80 nit | DVREF+5*△V1 | DVINT+5*△V2 |
| 60 nit | DVREF+6*△V1 | DVINT+6*△V2 |
| 30 nit | DVREF+7*△V1 | DVINT+7*△V2 |
| 10 nit | DVREF+8*△V1 | DVINT+8*△V2 |
| 7 nit | DVREF+9*△V1 | DVINT+9*△V2 |
| 4 nit | DVREF+10*△V1 | DVINT+10*△V2 |

FIG. 10A

410

| VREF | VINT | TLS |
|---|---|---|
| DVREF | DVINT | 6.76% |
| DVREF+△VA | DVINT | 4.82% |
| DVREF+2*△VA | DVINT | 3.01% |

420

| VREF | VINT | TLS |
|---|---|---|
| DVREF | DVINT | 6.76% |
| DVREF | DVINT+△VB | 5.35% |
| DVREF | DVINT+2*△VB | 4.73% |

430

| VREF | VINT | TLS |
|---|---|---|
| DVREF | DVINT | 6.76% |
| DVREF+△VA | DVINT+△VB | 2.96% |
| DVREF+2*△VA | DVINT+2*△VB | 1.81% |

FIG. 10B

460

| VREF | VINT | TLS |
|---|---|---|
| DVREF | DVINT | 25.43% |
| DVREF+△VA | DVINT | 25.32% |
| DVREF+2*△VA | DVINT | 24.41% |

470

| VREF | VINT | TLS |
|---|---|---|
| DVREF | DVINT | 25.43% |
| DVREF | DVINT+△VB | 16.13% |
| DVREF | DVINT+2*△VB | 12.60% |

480

| VREF | VINT | TLS |
|---|---|---|
| DVREF | DVINT | 25.43% |
| DVREF+△VA | DVINT+△VB | 15.11% |
| DVREF+2*△VA | DVINT+2*△VB | 11.42% |

DISPLAY DEVICE CAPABLE OF ADJUSTING AT LEAST ONE OF REFERENCE VOLTAGE AND INITIALIZATION VOLTAGE ACCORDING TO BRIGHTNESS VALUE

CROSS-REFERENCE TO RELATED APPLICATION(S)

This application claims priority to and the benefits of Korean Patent Application Nos. 10-2023-0041755, filed on Mar. 30, 2023 in the Korean Intellectual Property Office (KIPO), and 10-2023-0056970, filed on May 2, 2023 in the Korean Intellectual Property Office (KIPO), the entire contents of which are incorporated by reference herein.

BACKGROUND

1. Technical Field

Embodiments of the disclosure relate to a display device capable of reducing an image quality change according to a temperature.

2. Description of the Related Art

A pixel of a display device may include a storage capacitor, a scan transistor that transfers a data voltage to the storage capacitor in response to a scan signal, a driving transistor that generates a driving current based on the data voltage stored in the storage capacitor, and a light emitting element that emits light based on the driving current.

In a case where a threshold voltage of a driving transistor of a pixel is changed, the pixel may not emit with desired luminance. To eliminate or reduce a luminance error caused by the change of the threshold voltage, the pixel may perform a threshold voltage compensation operation that compensates for the threshold voltage of the driving transistor. However, even if the pixel performs the threshold voltage compensation operation, in a case where a temperature of a display panel is changed, the pixel may not emit with desired luminance.

SUMMARY

Some embodiments provide a display device capable of reducing an image quality change according to a temperature.

According to embodiments, a display device may include a display panel including a pixel, and a panel driver configured to drive the display panel, to receive a brightness value, and to generate a reference voltage and an initialization voltage. The pixel may include a driving transistor including a gate electrically connected to a gate node, and a source electrically connected to a source node, a storage capacitor including a first electrode electrically connected to the gate node, and a second electrode electrically connected to the source node, and a light emitting element including an anode electrically connected to the source node. In an initialization period, the reference voltage may be applied to the gate of the driving transistor, and the initialization voltage may be applied to the source of the driving transistor. In a compensation period, the driving transistor may be turned on based on the reference voltage such that a threshold voltage of the driving transistor may be stored between the first and second electrodes of the storage capacitor. The panel driver may adjust at least one of the reference voltage and the initialization voltage according to the brightness value.

In embodiments, the panel driver may increase at least one of the reference voltage and the initialization voltage as the brightness value decreases.

In embodiments, the panel driver may decrease a drain-source voltage of the driving transistor in the compensation period by increasing at least one of the reference voltage and the initialization voltage.

In embodiments, the panel driver may move a compensation point of the driving transistor in the compensation period to an operating point of the driving transistor in an emission period by decreasing the drain-source voltage of the driving transistor in the compensation period.

In embodiments, in case that the brightness value is between a reference brightness value and a maximum brightness value, the panel driver may adjust a luminance of the display panel according to the brightness value by adjusting a data voltage applied to the display panel. In case that the brightness value is between a minimum brightness value and the reference brightness value, the panel driver may adjust the luminance of the display panel according to the brightness value by adjusting a length of an emission period within each frame period.

In embodiments, in case that the brightness value is between the reference brightness value and the maximum brightness value, the panel driver may determine at least one of the reference voltage and the initialization voltage as a default voltage. In case that the brightness value is between a minimum brightness value and the reference brightness value, the panel driver may increase at least one of the reference voltage and the initialization voltage as the brightness value decreases.

In embodiments, the pixel may further include a first transistor configured to transfer a data voltage to the gate node in response to a writing signal, a second transistor configured to transfer the reference voltage to the gate node in response to a reference signal, a third transistor configured to transfer the initialization voltage to the anode of the light emitting element in response to an initialization signal, a fourth transistor configured to electrically connect a line transferring a first power supply voltage to a drain of the driving transistor in response to a first emission signal, a fifth transistor electrically connected between the source node and the anode of the light emitting element, and configured to electrically connect the source node to the anode of the light emitting element in response to a second emission signal, and a hold capacitor including a first electrode electrically connected to the source node, and a second electrode electrically connected to the line transferring the first power supply voltage.

In embodiments, the first transistor may include a gate receiving the writing signal, a first terminal electrically connected to a data line, and a second terminal electrically connected to the gate node, the second transistor may include a gate receiving the reference signal, a first terminal electrically connected to a line transferring the reference voltage, and a second terminal electrically connected to the gate node, the third transistor may include a gate receiving the initialization signal, a first terminal electrically connected to the anode of the light emitting element, and a second terminal electrically connected to a line transferring the initialization voltage, the fourth transistor may include a gate receiving the first emission signal, a first terminal electrically connected to the line transferring the first power supply voltage, and a second terminal electrically connected to the drain of the driving transistor, and the fifth transistor may include a gate receiving the second emission signal, a first terminal electrically connected to the source node, and a second terminal electrically connected to the anode of the light emitting element.

In embodiments, the driving transistor may further include a bottom gate electrically connected to the source node.

In embodiments, the pixel may further include a first transistor configured to transfer a data voltage to the gate node in response to a writing signal, a second transistor configured to transfer the reference voltage to the gate node in response to a reference signal, a third transistor configured to transfer the initialization voltage to the source node in response to an initialization signal, a fourth transistor configured to electrically connect a line transferring a first power supply voltage to a drain of the driving transistor in response to an emission signal, and a hold capacitor including a first electrode electrically connected to the source node, and a second electrode electrically connected to the line transferring the first power supply voltage.

In embodiments, the first transistor may include a gate receiving the writing signal, a first terminal electrically connected to a data line, and a second terminal electrically connected to the gate node, the second transistor may include a gate receiving the reference signal, a first terminal electrically connected to a line transferring the reference voltage, and a second terminal electrically connected to the gate node, the third transistor may include a gate receiving the initialization signal, a first terminal electrically connected to the source node, and a second terminal electrically connected to a line transferring the initialization voltage, and the fourth transistor may include a gate receiving the emission signal, a first terminal electrically connected to the line transferring the first power supply voltage, and a second terminal electrically connected to the drain of the driving transistor.

In embodiments, the pixel may further include a first transistor configured to transfer a data voltage to the gate node in response to a writing signal, a second transistor configured to transfer the reference voltage to the gate node in response to a reference signal, a third transistor configured to transfer the initialization voltage to the source node in response to an initialization signal, a fourth transistor configured to electrically connect a line transferring a first power supply voltage to a drain of the driving transistor in response to a first emission signal, a fifth transistor electrically connected between the source node and the anode of the light emitting element, and configured to electrically connect the source node to the anode of the light emitting element in response to a second emission signal, a sixth transistor configured to transfer an anode initialization voltage to the anode of the light emitting element in response to the initialization signal, and a hold capacitor including a first electrode electrically connected to the source node, and a second electrode electrically connected to the line transferring the first power supply voltage.

In embodiments, the first transistor may include a gate receiving the writing signal, a first terminal electrically connected to a data line, and a second terminal electrically connected to the gate node, the second transistor may include a gate receiving the reference signal, a first terminal electrically connected to a line transferring the reference voltage, and a second terminal electrically connected to the gate node, the third transistor may include a gate receiving the initialization signal, a first terminal electrically connected to the source node, and a second terminal electrically connected to a line transferring the initialization voltage, the fourth transistor may include a gate receiving the first emission signal, a first terminal electrically connected to the line transferring the first power supply voltage, and a second terminal electrically connected to the drain of the driving transistor, the fifth transistor may include a gate receiving the second emission signal, a first terminal electrically connected to the source node, and a second terminal electrically connected to the anode of the light emitting element, and the sixth transistor may include a gate receiving the initialization signal, a first terminal electrically connected to the anode of the light emitting element, and a second terminal electrically connected to a line transferring the anode initialization voltage.

In embodiments, the pixel may further include a first transistor configured to transfer a data voltage to the gate node in response to a first scan signal, a second transistor configured to transfer the reference voltage to the gate node in response to a second scan signal, a third transistor configured to transfer the initialization voltage to the anode of the light emitting element in response to a third scan signal, a fourth transistor configured to electrically connect a line transferring a first power supply voltage to a drain of the driving transistor in response to a first emission signal, a fifth transistor electrically connected between the source node and the anode of the light emitting element, and configured to electrically connect the source node to the anode of the light emitting element in response to a second emission signal, a hold capacitor including a first electrode electrically connected to the source node, and a second electrode, and a sixth transistor configured to transfer the reference voltage to the second electrode of the hold capacitor in response to the third scan signal.

In embodiments, the first transistor may include a gate receiving the first scan signal, a first terminal electrically connected to a data line, and a second terminal electrically connected to the gate node, the second transistor may include a gate receiving the second scan signal, a first terminal electrically connected to a line transferring the reference voltage, and a second terminal electrically connected to the gate node, the third transistor may include a gate receiving the third scan signal, a first terminal electrically connected to the anode of the light emitting element, and a second terminal electrically connected to a line transferring the initialization voltage, the fourth transistor may include a gate receiving the first emission signal, a first terminal electrically connected to the line transferring the first power supply voltage, and a second terminal electrically connected to the drain of the driving transistor, the fifth transistor may include a gate receiving the second emission signal, a first terminal electrically connected to the source node, and a second terminal electrically connected to the anode of the light emitting element, and the sixth transistor may include a gate receiving the third scan signal, a first terminal electrically connected to the second electrode of the hold capacitor, and a second terminal electrically connected to a line transferring the reference voltage.

According to embodiments, a display device may include a display panel including a pixel, and a panel driver configured to drive the display panel, to receive a brightness value, and to generate a reference voltage and an initialization voltage. The pixel may include a driving transistor including a gate electrically connected to a gate node, a drain, and a source electrically connected to a source node, a first transistor configured to transfer a data voltage to the gate node in response to a writing signal, a second transistor configured to transfer the reference voltage to the gate node in response to a reference signal, a third transistor configured to transfer the initialization voltage to an anode of a light emitting element in response to an initialization signal, a fourth transistor configured to electrically connect a line transferring a first power supply voltage to the drain of the driving transistor in response to a first emission signal, a fifth transistor configured to electrically connect the source node to the anode of the light emitting element in response to a second emission signal, a storage capacitor including a first electrode electrically connected to the gate node, and a second electrode electrically connected to the source node, a hold capacitor including a first electrode electrically connected to the source node, and a second electrode electrically connected to the line transferring the first power supply voltage, and a light emitting element including an anode electrically connected to the source node, and a cathode electrically connected to a line transferring a second power supply voltage. In an initialization period, the reference voltage may be applied to the gate of the driving transistor through the second transistor, and the initialization voltage may be applied to the source of the driving transistor through the third transistor and the fifth transistor. In a compensation period, the first power supply voltage may be applied to the drain of the driving transistor through the fourth transistor, and the driving transistor may be turned on based on the reference voltage such that a threshold voltage of the driving transistor is stored between the first and second electrodes of the storage capacitor. The panel driver may adjust at least one of the reference voltage and the initialization voltage according to the brightness value.

In embodiments, the panel driver may increase at least one of the reference voltage and the initialization voltage as the brightness value decreases.

In embodiments, in case that the brightness value is between a reference brightness value and a maximum brightness value, the panel driver may determine at least one of the reference voltage and the initialization voltage as a default voltage. In case that the brightness value is between a minimum brightness value and the reference brightness value, the panel driver may increase at least one of the reference voltage and the initialization voltage as the brightness value decreases.

According to embodiments, a display device may include a display panel including a pixel, and a panel driver configured to drive the display panel, to receive a brightness value, and to generate a reference voltage and an initialization voltage. The pixel may include a driving transistor including a gate electrically connected to a gate node, and a source electrically connected to a source node, a storage capacitor including a first electrode electrically connected to the gate node, and a second electrode electrically connected to the source node, and a light emitting element including an anode electrically connected to the source node. In an initialization period, the reference voltage may be applied to the gate of the driving transistor, and the initialization voltage may be applied to the source of the driving transistor. In a compensation period, the driving transistor may be turned on based on the reference voltage such that a threshold voltage of the driving transistor is stored between the first and second electrodes of the storage capacitor. The panel driver may adjust both the reference voltage and the initialization voltage according to the brightness value.

In embodiments, in case that the brightness value is between a reference brightness value and a maximum brightness value, the panel driver may determine the reference voltage and the initialization voltage as a default reference voltage and a default initialization voltage, respectively. In case that the brightness value is between a minimum brightness value and the reference brightness value, as the brightness value decreases, the panel driver may increase the reference voltage, and may increase the initialization voltage.

As described above, in a display device according to embodiments, in an initialization period, a reference voltage may be applied to a gate of a driving transistor of each pixel, and an initialization voltage may be applied to a source of the driving transistor. In a compensation period, a threshold voltage compensation operation for the driving transistor may be performed based on the reference voltage in a source follower manner. Further, at least one of the reference voltage and the initialization voltage may be adjusted according to a brightness value (or a display brightness value (DBV)). Accordingly, a compensation point of the driving transistor in the compensation period may be moved to an operating point of the driving transistor in an emission period, and an image quality change (e.g., a luminance change and/or a color coordinate change) according to a temperature may be reduced or minimized.

BRIEF DESCRIPTION OF THE DRAWINGS

Illustrative, non-limiting embodiments will be more clearly understood from the following detailed description in conjunction with the accompanying drawings.

FIG. 5 is a schematic diagram illustrating an example of a reference voltage and an initialization voltage according to a brightness value in a display device according to embodiments.

FIG. 9 is a schematic diagram illustrating an example of a reference voltage and an initialization voltage according to a brightness value in a display device according to embodiments.

FIG. 10A is a schematic diagram for describing examples of a temperature luminance sensitivity in cases where a brightness value is about 100 nit and a reference voltage and/or an initialization voltage are increased, and FIG. 10B is a schematic diagram for describing examples of a temperature luminance sensitivity in cases where the brightness value is about 4 nit and the reference voltage and/or the initialization voltage are increased.

DETAILED DESCRIPTION OF THE EMBODIMENTS

Figure 1:
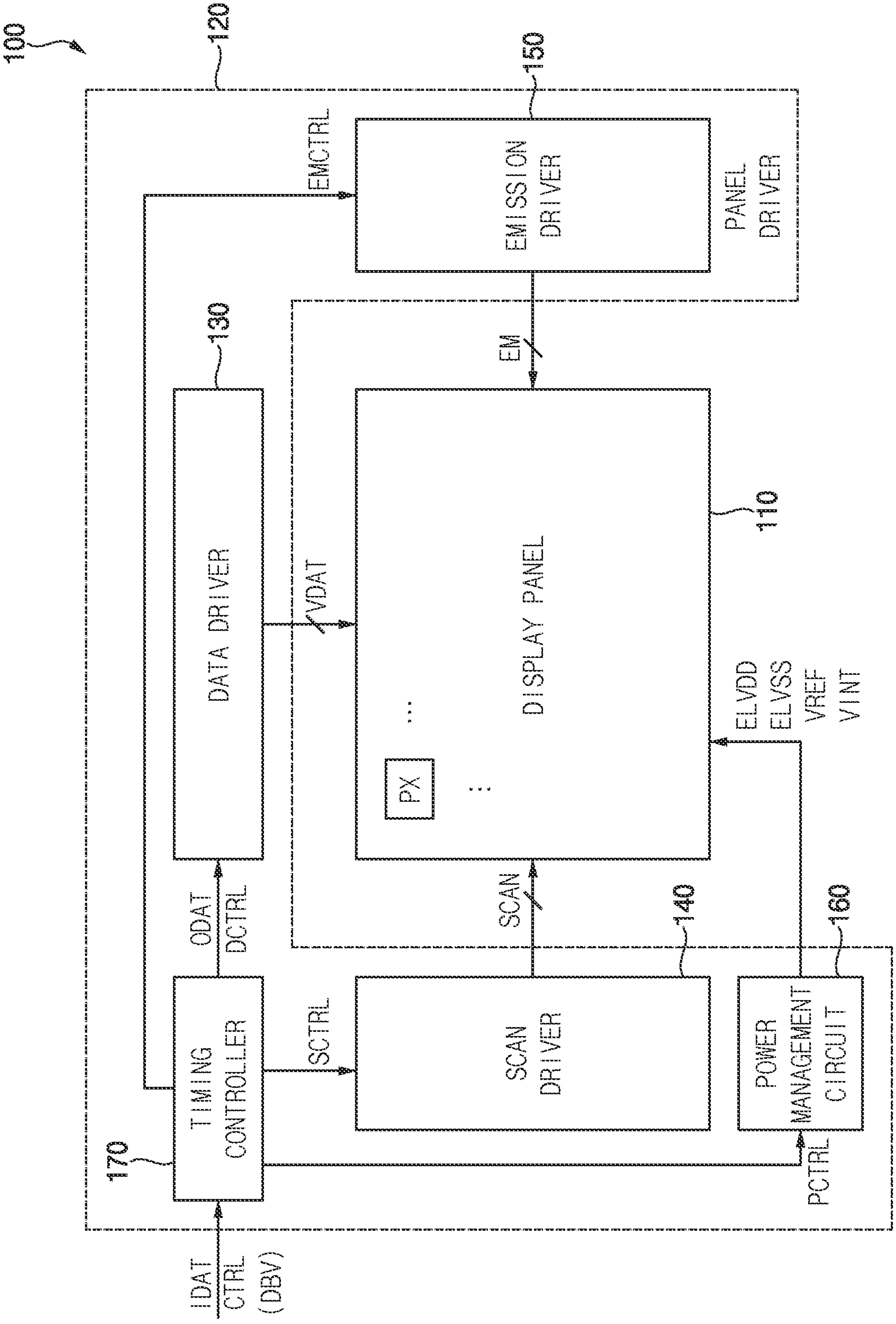
FIG. 1 is a schematic block diagram illustrating a display device according to embodiments.

Hereinafter, embodiments of the disclosure will be explained in detail with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the drawings, sizes, thicknesses, ratios, and dimensions of the elements may be exaggerated for ease of description and for clarity. Like numbers refer to like elements throughout.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

It will be understood that the terms "connected to" or "coupled to" may include a physical or electrical connection or coupling.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
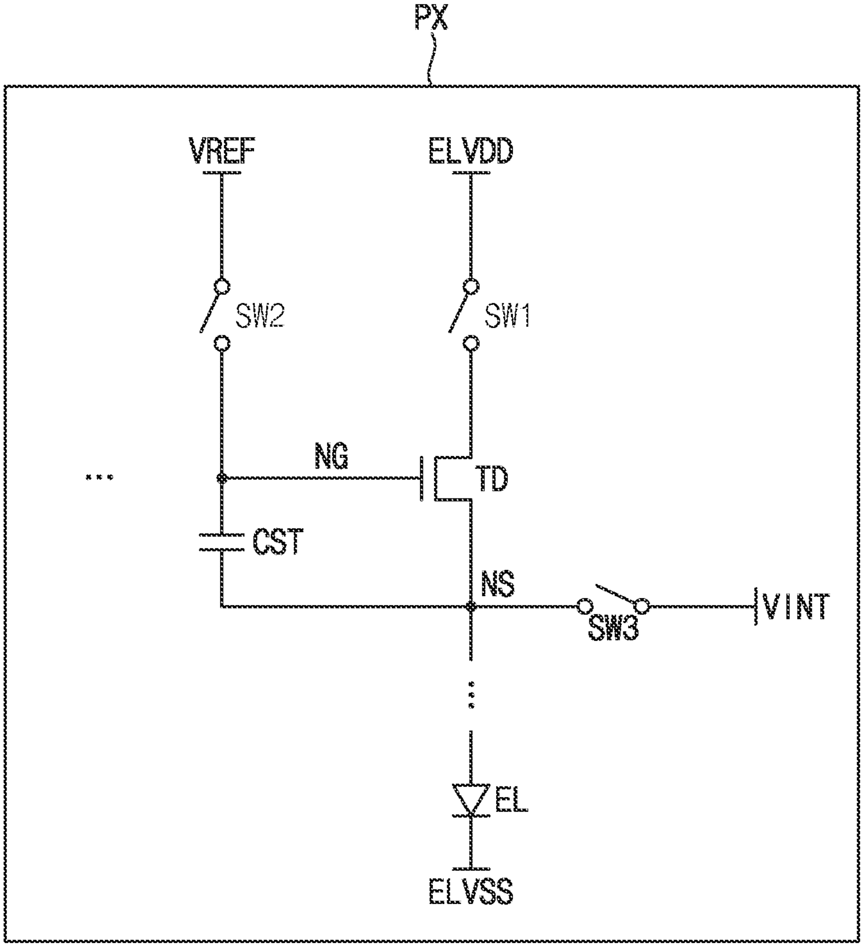
FIG. 2 is a schematic circuit diagram illustrating a portion of a pixel included in a display device according to embodiments.
Figure 3:
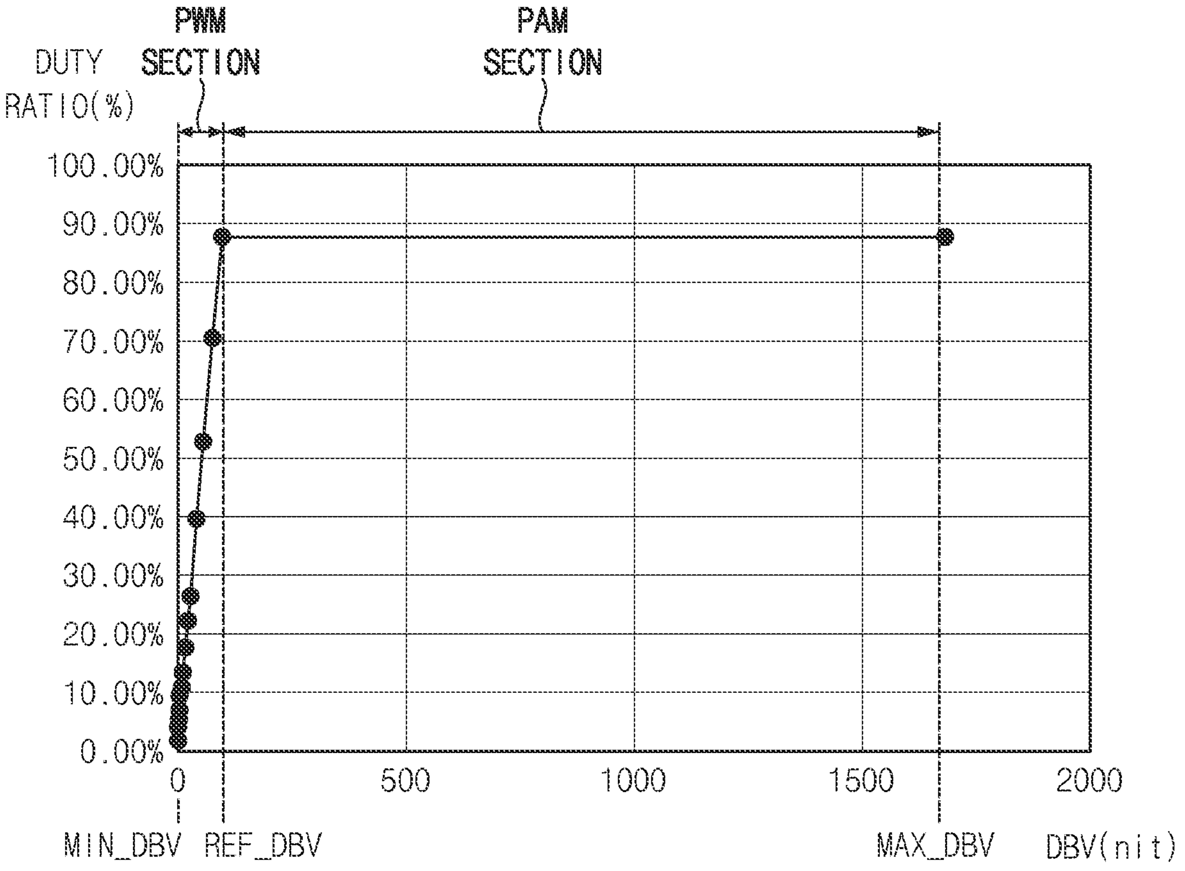
FIG. 3 is a schematic diagram illustrating an emission on duty ratio for each pixel according to a brightness value in a display device according to embodiments.
Figure 4:
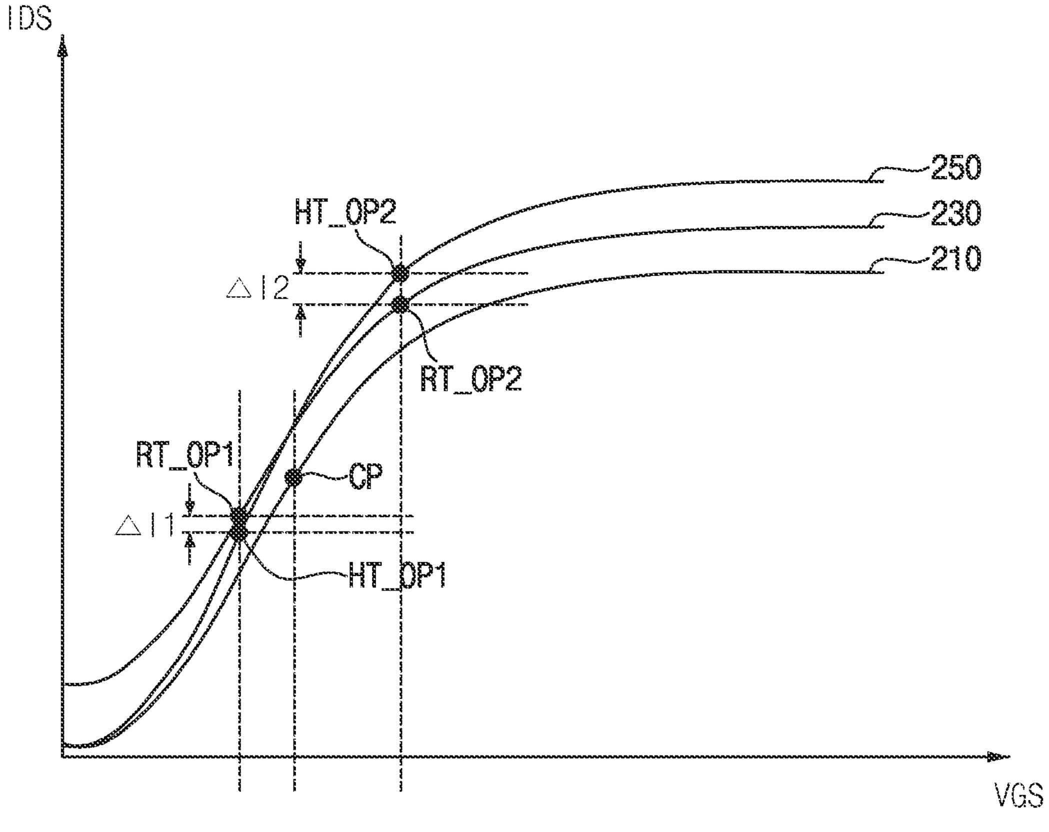
FIG. 4 is a schematic diagram illustrating a compensation period transfer curve of a driving transistor, an emission period transfer curve of the driving transistor at a room temperature, and an emission period transfer curve of the driving transistor at a high temperature in a related display device.
Figure 6:
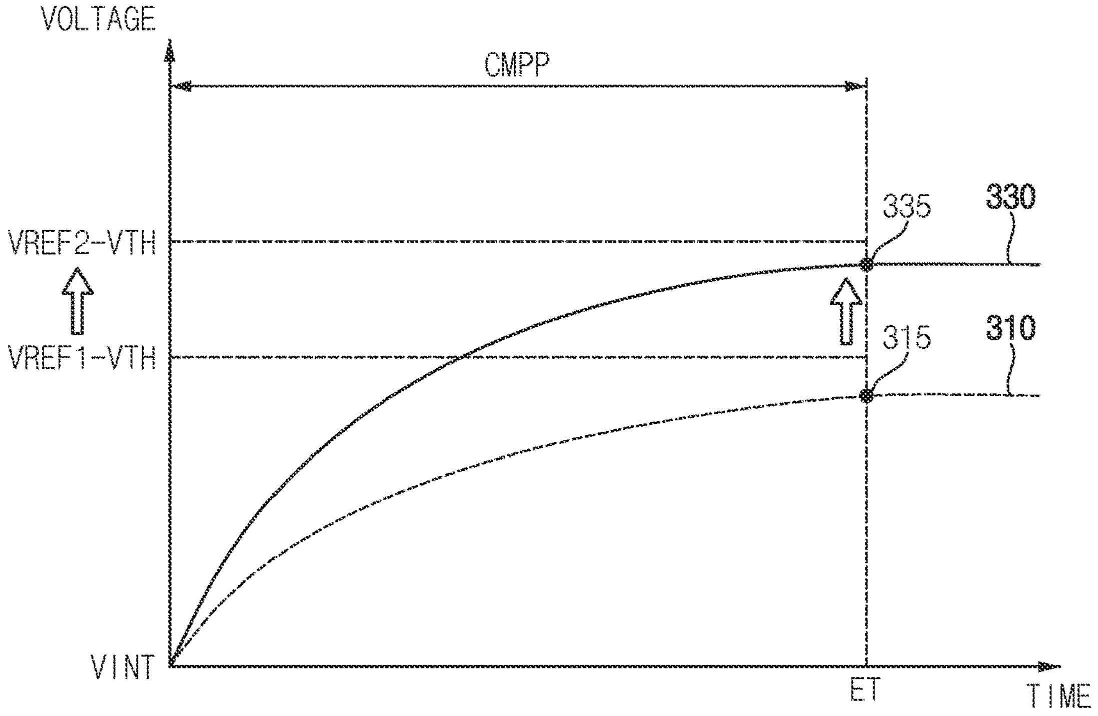
FIG. 6 is a schematic diagram for describing an example of a voltage of a source node in a compensation period in case that a reference voltage is increased.
Figure 7:
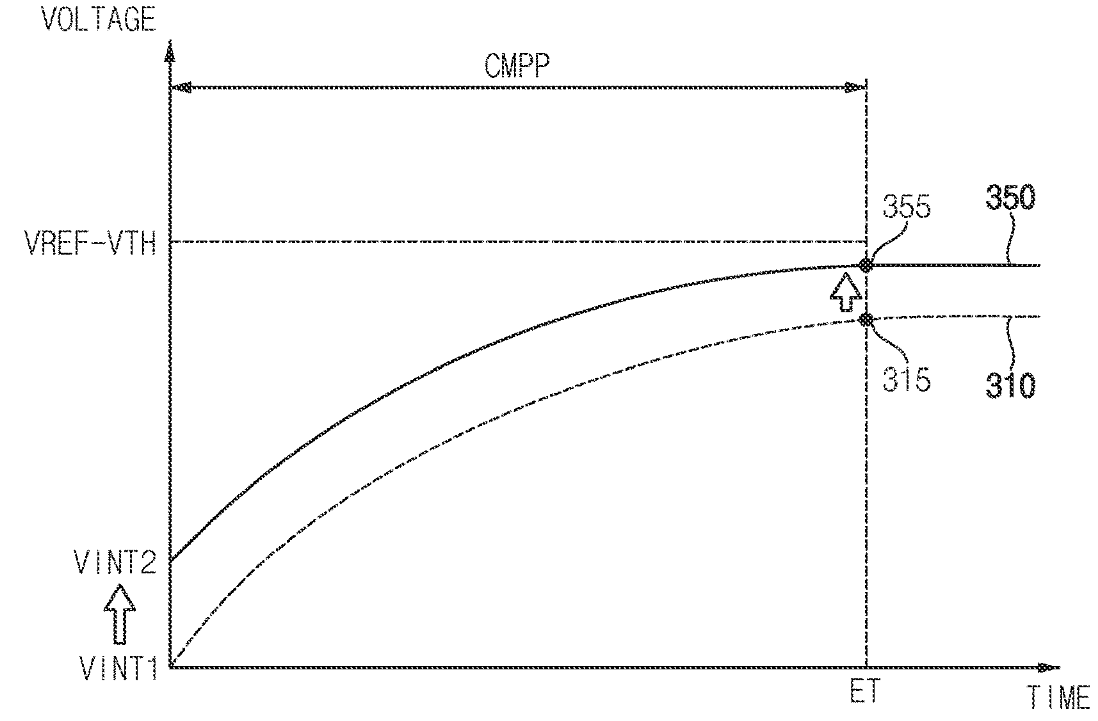
FIG. 7 is a schematic diagram for explaining an example of a voltage of a source node in a compensation period in case that an initialization voltage is increased.
Figure 8:
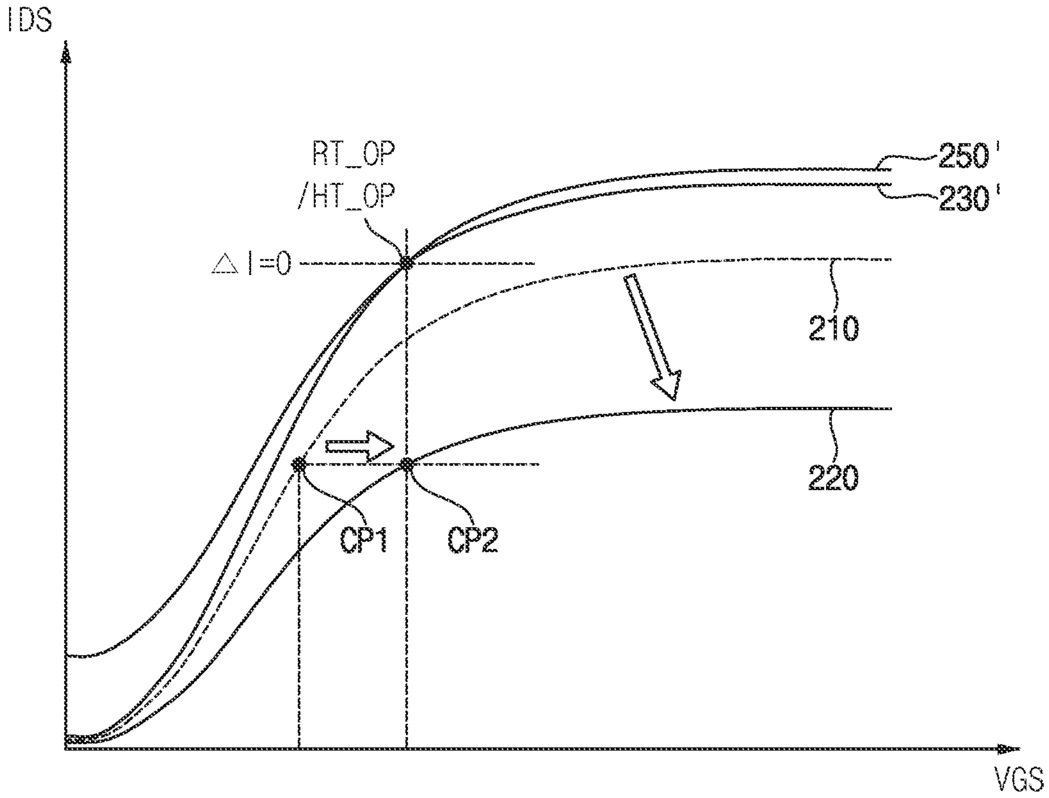
FIG. 8 is a schematic diagram illustrating a compensation period transfer curve of a driving transistor, an emission period transfer curve of the driving transistor at a room temperature, and an emission period transfer curve of the driving transistor at a high temperature in a display device according to embodiments.

FIG. 1 is a schematic block diagram illustrating a display device according to embodiments. FIG. 2 is a schematic circuit diagram illustrating a portion of a pixel included in a display device according to embodiments. FIG. 3 is a schematic diagram illustrating an emission on duty ratio for each pixel according to a brightness value in a display device according to embodiments. FIG. 4 is a schematic diagram illustrating a compensation period transfer curve of a driving transistor, an emission period transfer curve of the driving transistor at a room temperature, and an emission period transfer curve of the driving transistor at a high temperature in a related art display device. FIG. 5 is a schematic diagram illustrating an example of a reference voltage and an initialization voltage according to a brightness value in a display device according to embodiments. FIG. 6 is a schematic diagram for describing an example of a voltage of a source node in a compensation period in case that a reference voltage is increased. FIG. 7 is a schematic diagram for explaining an example of a voltage of a source node in a compensation period in case that an initialization voltage is increased. FIG. 8 is a schematic diagram illustrating a compensation period transfer curve of a driving transistor, an emission period transfer curve of the driving transistor at a room temperature, and an emission period transfer curve of the driving transistor at a high temperature in a display device according to embodiments.

Referring to FIG. 1, a display device 100 according to embodiments may include a display panel 110 including pixels PX, and a panel driver 120 that drives the display panel 110. In some embodiments, the panel driver 120 may include a data driver 130 that provides data voltages VDAT to the pixels PX, a scan driver 140 that provides scan signals SCAN to the pixels PX, an emission driver 150 that provides emission signals EM to the pixels PX, a power management circuit 160 that generates voltages ELVDD, ELVSS, VREF and VINT for driving the display panel 110, and a controller 170 that controls the data driver 130, the scan driver 140, the emission driver 150 and the power management circuit 160.

The display panel 110 may include data lines, scan lines, emission lines, and the pixels PX connected thereto. In some embodiments, as illustrated in FIG. 2, each pixel PX may include a driving transistor TD including a gate connected to a gate node NG, and a source connected to a source node NS, a storage capacitor CST including a first electrode connected to the gate node NG, and a second electrode connected to the source node NS, and a light emitting element EL including an anode connected to the source node NS, and a cathode connected to a line transferring a second power supply voltage ELVSS (e.g., a low power supply voltage). For example, the light emitting element EL may be an organic light emitting diode (OLED), and the display panel 110 may be an OLED display panel. In other examples, the light emitting element EL may be a nano light emitting diode (NED), a quantum dot (QD) light emitting diode, a micro light emitting diode, an inorganic light emitting diode, or any other suitable light emitting element.

In some embodiments, as illustrated in FIG. 2, each pixel PX may further include a first switch SW1 (e.g., a fourth transistor T4 illustrated in FIG. 11) that selectively provides a first power supply voltage ELVDD (e.g., a high power supply voltage) to a drain of the driving transistor TD, a second switch SW2 (e.g., a second transistor T2 illustrated in FIG. 11) that selectively provides a reference voltage VREF to the gate node NG, and a third switch SW3 (e.g., a third transistor T3 illustrated in FIG. 11) that selectively provides an initialization voltage VINT to the source node NS. In an initialization period, the first switch SW1 may be turned off, and the second and third switches SW2 and SW3 may be turned on. Thus, in the initialization period, the reference voltage VREF may be applied to the gate node NG, or the gate of the driving transistor TD, and the initialization voltage VINT may be applied to the source node NS, or the source of the driving transistor TD. In a compensation period after the initialization period, the first and second switches SW1 and SW2 may be turned on, and the third switch SW3 may be turned off. Thus, in the compensation period, the reference voltage VREF may be applied to the gate of the driving transistor TD, the first power supply voltage ELVDD may be applied to the drain of the driving transistor TD, and the driving transistor TD may be turned on based on the reference voltage VREF such that a threshold voltage of the driving transistor TD may be stored between the first and second electrodes of the storage capacitor CST. For example, in the compensation period, the driving transistor TD may operate as a source follower, a voltage of the source of the driving transistor TD may become a voltage (e.g., a voltage obtained by subtracting the threshold voltage of the driving transistor TD from the reference voltage VREF) that is close to the reference voltage VREF at the gate of the driving transistor TD, and thus the threshold voltage of the driving transistor TD may be stored between the first and second electrodes of the storage capacitor CST. This operation may be referred to as a source follower type threshold voltage compensation operation. Further, in a writing period after the compensation period, the data voltage VDAT may be applied to the gate node NG. Further, in an emission period after the writing period, the first switch SW1 may be turned on, and the second and third switches SW2 and SW3 may be turned off. Thus, in the emission period, the driving transistor TD generates a driving current, and the light emitting element EL may emit light based on the driving current.

The data driver 130 may generate the data voltages VDAT based on output image data ODAT and a data control signal DCTRL received from the controller 170, and may provide the data voltages VDAT to the pixels PX through the data lines. In some embodiments, the data control signal DCTRL may include, but is not limited to, an output data enable signal, a horizontal start signal and a load signal. In some embodiments, the data driver 130 and the controller 170 may be implemented as a single integrated circuit, and the single integrated circuit may be referred to as a timing controller embedded data driver (TED) integrated circuit. In other embodiments, the data driver 130 and the controller 170 may be implemented as separate integrated circuits.

The scan driver 140 may generate the scan signals SCAN based on a scan control signal SCTRL received from the controller 170, and may provide the scan signals SCAN to the pixels PX through the scan lines. In some embodiments, the scan control signal SCTRL may include, but is not limited to, a scan start signal and a scan clock signal. Further, in some embodiments, the scan driver 140 may sequentially provide the scan signals SCAN to the pixels PX on a row-by-row basis. In other embodiments, the scan driver 140 may provide at least some of the scan signals SCAN to the pixels PX in units of two or more rows. Further, in some embodiments, the scan signal SCAN applied to each pixel PX may include, but is not limited to, a writing signal GW, a reference signal GR and an initialization signal GI. further, in some embodiments, the scan driver 140 may be integrated or formed in the display panel 110. In other embodiments, the scan driver 140 may be implemented as one or more integrated circuits.

The emission driver 150 may provide the emission signals EM to the pixels PX based on an emission control signal EMCTRL received from the controller 170. In some embodiments, the emission control signal EMCTRL may include, but is not limited to, an emission start signal and an emission clock signal. Further, in some embodiments, the emission driver 150 may sequentially provide the emission signals EM to the pixels PX on a row-by-row basis. In other embodiments, the emission driver 150 may provide at least some of the emission signals EM to the pixels PX in units of two or more rows. Further, in some embodiments, the emission driver 150 may be integrated or formed in the display panel 110. In other embodiments, the emission driver 150 may be implemented as one or more integrated circuits.

The power management circuit 160 may generate voltages for an operation of the display device 100 based on a power control signal PCTRL received from the controller 170. For example, the power management circuit 160 may generate the first power supply voltage ELVDD, the second power supply voltage ELVSS, the reference voltage VREF and the initialization voltage VINT provided to the display panel 110. In some embodiments, the power management circuit 160 may be implemented as a power management integrated circuit (PMIC), but is not limited thereto. In other embodiments, the power management circuit 160 may be included in the controller 170 and/or the data driver 130.

The controller 170 (e.g., a timing controller (TCON)) may receive input image data IDAT and a control signal CTRL from an external host processor (e.g., a graphics processing unit (GPU), an application processor (AP) or a graphics card). The control signal CTRL may include a brightness value DBV (or a display brightness value). For example, the brightness value DBV may indicate, but is not limited to, a luminance of the display panel 110 at the maximum gray level (e.g., a 255-gray level). In some embodiments, the control signal CTRL may further include, but is not limited to, a vertical synchronization signal, a horizontal synchronization signal, an input data enable signal, a master clock signal, etc. The controller 170 may generate the output image data ODAT, the data control signal DCTRL, the scan control signal SCTRL, the emission control signal EMCTRL and the power control signal PCTRL based on the input image data IDAT and the control signal CTRL. The controller 170 may control an operation of the data driver 130 by providing the output image data ODAT and the data control signal DCTRL to the data driver 130, may control an operation of the scan driver 140 by providing the scan control signal SCTRL to the scan driver 140, may control an operation of the emission driver 150 by providing the emission control signal EMCTRL to the emission driver 150, and may control an operation of the power management circuit 160 by providing the power control signal PCTRL to the power management circuit 160.

In the display device 100 according to embodiments, the panel driver 120 may adjust the luminance of the display panel 110 according to the brightness value DBV received from the external host processor. In some embodiments, as illustrated in FIG. 3, in case that the brightness value DBV is between a reference brightness value REF_DBV (e.g., about 100 nit) and a maximum brightness value MAX_DBV (e.g., about 1,680 nit), the panel driver 120 may maintain a ratio of the emission period to the frame period (e.g., as about 87%), and may adjust the luminance of the display panel 110 according to the brightness value DBV by adjusting the data voltage VDAT applied to the display panel 110. Further, in case that the brightness value DBV is between a minimum brightness value MIN_DBV (e.g., about 0 nit) and the reference brightness value REF_DBV, the panel driver 120 may adjust the luminance of the display panel 110 according to the brightness value DBV by adjusting the ratio of the emission period to the frame period, or by adjusting a length of the emission period within each frame period. Thus, a section from the minimum brightness value MIN_DBV to the reference brightness value REF_DBV may be referred to as a pulse width modulation (PWM) section, and a section from the reference brightness value REF_DBV to the maximum brightness value MAX_DBV may be referred to as a pulse amplitude modulation (PAM) section.

In a related art display device, even if a threshold voltage compensation operation is performed in a compensation period, in a case where a compensation point of a driving transistor of a pixel in the compensation period is different from an operating point of the driving transistor in an emission period, a luminance of the pixel may be changed according to a temperature of a display panel. Here, the compensation point may mean a point in a transfer curve (or a transfer characteristic curve) representing a drain-source current according to a gate-source voltage of the driving transistor in the compensation period (or at an end time point of the compensation period), and the operating point may mean a point in a transfer curve representing a drain-source current according to a gate-source voltage of the driving transistor in the emission period.

FIG. 4 illustrates, in the related art display device, a compensation period transfer curve 210 which is a transfer curve representing the drain-source current IDS according to the gate-source voltage VGS of the driving transistor in the compensation period, an emission period transfer curve 230 at a room temperature which is a transfer curve representing the drain-source current IDS according to the gate-source voltage VGS of the driving transistor in the emission period in case that the temperature of the display panel 110 is the room temperature, and an emission period transfer curve 250 at a high temperature which is a transfer curve representing the drain-source current IDS according to the gate-source voltage VGS of the driving transistor in the emission period in case that the temperature of the display panel 110 is the high temperature. In FIG. 4, CP may denote a compensation point in the compensation period, RT_OP1 and RT_OP2 may denote operating points at the room temperature, and HT_OP1 and HT_OP2 may denote operating points at the high temperature. Further, RT_OP1 and HT_OP1 may be operating points for a predetermined or selected luminance (e.g., about 0.5 nit) in case that the brightness value DBV is about 1,000 nit, and RT_OP2 and HT_OP2 may be operating points for the same luminance (e.g., about 0.5 nit) in case that the brightness value DBV is about 10 nit. As illustrated in FIG. 4, so that the pixel PX may emit light with the same luminance (e.g., about 0.5 nit), the gate-source voltage VGS of the driving transistor in case that the brightness value DBV is about 10 nit within the PWM section may be higher than the gate-source voltage VGS of the driving transistor in case that the brightness value DBV is about 1,000 nit within the PAM section. Further, compared with the operating points RT_OP1 and HT_OP1 (or the gate-source voltages VGS corresponding to the operating points RT_OP1 and HT_OP1) of the driving transistor in case that the brightness value DBV are about 1,000 nit within the PAM section, the operating points RT_OP2 and HT_OP2 (or the gate-source voltages VGS corresponding to the operating points RT_OP2 and HT_OP2) of the driving transistor in case that the brightness value DBV is about 10 nit within the PWM section may be far from the compensation point CP of the driving transistor. Thus, a difference ΔI2 between the drain-source currents IDS of the driving transistor at the room temperature and at the high temperature in case that the brightness value DBV is within the PWM section may be greater than a difference ΔI1 between the drain-source currents IDS of the driving transistor at the room temperature and at the high temperature in case that the brightness value DBV is within the PAM section. Accordingly, in case that the brightness value DBV is within the PWM section, the luminance and/or a color coordinate of the pixel may be relatively greatly changed according to the temperature.

To reduce an image quality change due to the temperature, in the display device 100 according to embodiments, the panel driver 120 may adjust at least one of the reference voltage VREF and the initialization voltage VINT according to the brightness value DBV. For example, in case that the brightness value DBV is changed, the controller 170 may provide the power control signal PCTRL to the power management circuit 160 to adjust at least one of the reference voltage VREF and the initialization voltage VINT. In some embodiments, the panel driver 120 may determine at least one of the reference voltage VREF and the initialization voltage VINT as a default voltage in case that the brightness value DBV is between the reference brightness value REF_DBV and the maximum brightness value MAX_DBV, and may increase at least one of the reference voltage VREF and the initialization voltage VINT as the brightness value (DBV) decreases in case that the brightness value DBV is between the minimum brightness value MIN_DBV and the reference brightness value REF_DBV.

For example, as illustrated in FIG. 5, in case that the brightness value DBV is within the PAM section from the reference brightness value REF_DBV of about 100 nit to the maximum brightness value MAX_DBV of about 1,680 nit, the panel driver 120 may determine the reference voltage VREF and the initialization voltage VINT as a default reference voltage DVREF and a default initialization voltage DVINT, respectively. Further, in case that the brightness value DBV is within the PWM section from the minimum brightness value MIN_DBV of about 0 nit to the reference brightness value REF_DBV of about 100 nit, the panel driver 120 may gradually increase both the reference voltage VREF and the initialization voltage VINT as the brightness value DBV decreases. For example, in a case the brightness value DBV gradually decreases from the reference brightness value REF_DBV of about 100 nit to about 4 nit, the reference voltage VREF may be gradually increased by an interval of a first voltage difference ΔV1 from the default reference voltage DVREF, and the initialization voltage VINT may be gradually increased by an interval of a second voltage difference ΔV2 from the default initialization voltage DVINT. In some embodiments, the first voltage difference ΔV1 and the second voltage difference ΔV2 may be substantially the same as each other, but are not limited thereto.

In a case where the reference voltage VREF and/or the initialization voltage VINT are increased, at the end time point of the compensation period, the voltage of the source node NS, or the voltage of the source of the driving transistor TD may be increased, and a drain-source voltage of the driving transistor TD may be decreased.

FIG. 6 illustrates a voltage curve 310 of the source node NS according to a time within the compensation period CMPP in case that the reference voltage VREF is a first reference voltage VREF1, and a voltage curve 330 of the source node NS according to time within the compensation period CMPP in case that the reference voltage VREF is a second reference voltage VREF2 higher than the first reference voltage VREF1. As illustrated in FIG. 6, at a start time point of the compensation period CMPP, the voltage of the source node NS may be the initialization voltage VINT. Further, in the compensation period CMPP, the voltage of the source node NS may be changed close to a voltage obtained by subtracting the threshold voltage VTH of the driving transistor TD from the reference voltage VREF. Thus, in a case where the reference voltage VREF is increased from the first reference voltage VREF1 to the second reference voltage VREF2, the voltage 335 of the source node NS at the end time point ET of the compensation period CMPP may be increased from the voltage 315 of the source node NS corresponding to the first reference voltage VREF1. For example, in the case where the reference voltage VREF is increased from the first reference voltage VREF1 to the second reference voltage VREF2, the voltage of the source of the driving transistor TD may be increased. Further, since the first power supply voltage ELVDD may be applied to the drain of the driving transistor TD in the compensation period CMPP, the drain-source voltage of the driving transistor TD, or a voltage obtained by subtracting the voltage 335 of the source node NS from the first power supply voltage ELVDD may be decreased.

FIG. 7 illustrates a voltage curve 310 of the source node NS according to time within the compensation period CMPP in case that the initialization voltage VINT is a first initialization voltage VINT1, and a voltage curve 350 of the source node NS according to time within the compensation period CMPP in case that the initialization voltage VINT is a second initialization voltage VINT2 higher than the first initialization voltage VINT1. As illustrated in FIG. 7, in a case where the initialization voltage VINT is increased from the first initialization voltage VINT1 to the second initialization voltage VINT2, the voltage 355 of the source node NS at the end time point ET of the compensation period CMPP may be increased from the voltage 315 of the source node NS corresponding to the first initialization voltage VINT1. For example, in a case where the initialization voltage VINT is increased from the first initialization voltage VINT1 to the second initialization voltage VINT2, the voltage of the source of the driving transistor TD may be increased, and the drain-source voltage of the driving transistor TD, or the voltage obtained by subtracting the voltage 355 of the source node NS from the first power supply voltage ELVDD may be decreased.

If the drain-source voltage of the driving transistor TD in the compensation period CMPP (or at the end time point ET of the compensation period CMPP) is decreased, the compensation point of the driving transistor TD in the compensation period CMPP (or at the end time point ET of the compensation period CMPP) may be moved close to the operating point of the driving transistor TD in the emission period.

For example, as illustrated in FIG. 8, if the drain-source voltage of the driving transistor TD in the compensation period CMPP is decreased, the drain-source current IDS caused by the same gate-source voltage VGS may be decreased, and thus the compensation period transfer curve 210 of the driving transistor TD may be changed to a compensation period transfer curve 220 lower than the compensation period transfer curve 210. The drain-source current IDS of the driving transistor TD in the compensation period CMPP may be substantially constant, and a compensation point CP1 of the driving transistor TD in the compensation period CMPP (or at the end time point ET of the compensation period CMPP) may be moved to a compensation point CP2 close to the operating points RT_OP and HT_OP in the emission period. Thus, in a case where the driving transistor TD performs the threshold voltage compensation operation at the compensation point CP2 close to the operating points RT_OP and HT_OP in the emission period, the emission period transfer curve 230' at the room temperature and the emission period transfer curve 250' at the high temperature may have the operating points RT_OP and HT_OP close to each other. Accordingly, there may be almost no difference ΔI1 between the drain-source currents IDS of the driving transistor TD at the room temperature and at the high temperature. For example, in a case where the compensation point CP1 in the compensation period CMPP is moved to the compensation point CP2 close to the operating points RT_OP and HT_OP in the emission period, the image quality change (e.g., the luminance change and/or the color coordinate change) according to the temperature may be reduced or minimized.

As described above, in the display device 100 according to embodiments, in the initialization period, the reference voltage VREF may be applied to the gate of the driving transistor TD of each pixel PX, and the initialization voltage VINT may be applied to the source of the driving transistor TD. In the compensation period CMPP, the threshold voltage compensation operation for the driving transistor TD may be performed based on the reference voltage VREF in a source follower manner. Further, at least one of the reference voltage VREF and the initialization voltage VINT may be adjusted according to the brightness value DBV. Accordingly, the compensation point of the driving transistor TD in the compensation period CMPP may be moved to the operating point of the driving transistor TD in the emission period, and the image quality change (e.g., the luminance change and/or the color coordinate change) according to the temperature may be reduced or minimized.

FIG. 9 is a schematic diagram illustrating an example of a reference voltage and an initialization voltage according to a brightness value in a display device according to embodiments.

Referring to FIGS. 1 and 9, in a display device 100 according to embodiments, a panel driver 120 may adjust at least one of a reference voltage VREF and an initialization voltage VINT according to a brightness value DBV. In some embodiments, the panel driver 120 may increase at least one of the reference voltage VREF and the initialization voltage VINT as the brightness value DBV decreases in the entire range of the brightness value DBV. For example, as illustrated in FIG. 9, in case that the brightness value DBV is about 1,680 nit, the panel driver 120 may generate a default reference voltage DVREF and a default initialization voltage DVINT as the reference voltage VREF and the initialization voltage VINT, respectively. Further, the panel driver 120 may increase the reference voltage VREF and the initialization voltage VINT as the brightness value DBV decreases. For example, in case that the brightness value DBV gradually decreases from about 1680 nit to about 4 nit, the reference voltage VREF may be gradually increased by an interval of a first voltage difference ΔV1 from the default reference voltage DVREF, and the initialization voltage VINT may be gradually increased by an interval of a second voltage difference ΔV2 from the default initialization voltage DVINT. In a case where the reference voltage VREF and/or the initialization voltage VINT are increased, in a compensation period, a voltage of a source of a driving transistor may be increased, and a drain-source voltage of the driving transistor may be decreased. If the drain-source voltage of the driving transistor is decreased in the compensation period, a compensation point in the compensation period may be moved close to an operating point in an emission period. Accordingly, in the display device 100 according to embodiments, an image quality change (e.g., a luminance change and/or a color coordinate change) according to a temperature may be reduced or minimized.

FIG. 10A is a schematic diagram for describing examples of a temperature luminance sensitivity in cases where a brightness value is about 100 nit and a reference voltage and/or an initialization voltage are increased, and FIG. 10B is a schematic diagram for describing examples of a temperature luminance sensitivity in cases where the brightness value is about 4 nit and the reference voltage and/or the initialization voltage are increased.

FIG. 10A illustrates measured values of a temperature luminance sensitivity TLS of a display device according to embodiments in cases where a brightness value is about 100 nit, input image data represent a 7-gray level, and a reference voltage VREF and/or an initialization voltage VINT are increased. Here, the temperature luminance sensitivity TLS represents a luminance increase rate as a temperature increases. Thus, the lower the temperature luminance sensitivity TLS, the smaller the luminance change according to the temperature. As disclosed in a first table 410, in case that the reference voltage VREF is increased by a predetermined or selected voltage difference ΔVA from a default reference voltage DVREF, the temperature luminance sensitivity TLS may be decreased from about 6.76% to about 4.82%. Further, in case that the reference voltage VREF is further increased by the predetermined or selected voltage difference ΔVA, the temperature luminance sensitivity TLS may be further decreased from about 4.82% to about 3.01%. As disclosed in a second table 420, in case that the initialization voltage VINT is increased by a predetermined or selected voltage difference ΔVB from a default initialization voltage DVINT, the temperature luminance sensitivity TLS may be decreased from about 6.76% to about 5.35%. Further, in case that the initialization voltage VINT is further increased by the predetermined or selected voltage difference ΔVB, the temperature luminance sensitivity TLS may be further decreased from about 5.35% to about 4.73%. As disclosed in a third table 430, in case that the reference voltage VREF is increased by the predetermined or selected voltage difference ΔVA from the default reference voltage DVREF, and the initialization voltage VINT is increased by the predetermined or selected voltage difference ΔVB from the default initialization voltage DVINT, the temperature luminance sensitivity TLS may be decreased from about 6.76% to about 2.96%. Further, in case that the reference voltage VREF is further increased by the predetermined or selected voltage difference ΔVA and the initialization voltage VINT is further increased by the predetermined or selected voltage difference ΔVB, the temperature luminance sensitivity TLS may be further decreased from about 2.96% to about 1.81%.

FIG. 10B illustrates measured values of the temperature luminance sensitivity TLS of the display device according to embodiments in cases where the brightness value is about 4 nit, the input image data represent a 60-gray level, and the reference voltage VREF and/or the initialization voltage VINT are increased. As disclosed in a fourth table 460, in case that the reference voltage VREF is increased by the predetermined or selected voltage difference ΔVA from the default reference voltage DVREF, the temperature luminance sensitivity TLS may be decreased from about 25.43% to about 25.32%. Further, in case that the reference voltage VREF is further Increased by the predetermined or selected voltage difference ΔVA, the temperature luminance sensitivity TLS may be further decreased from about 25.32% to about 24.41%. As disclosed in a fifth table 470, in case that the initialization voltage VINT is increased by the predetermined or selected voltage difference ΔVB from the default initialization voltage DVINT, the temperature luminance sensitivity TLS may be decreased from about 25.43% to about 16.13%. Further, in case that the initialization voltage VINT is further increased by the predetermined or selected voltage difference ΔVB, the temperature luminance sensitivity TLS may be further decreased from about 16.13% to about 12.60%. As disclosed in a sixth table 480, in case that the reference voltage VREF is increased by the predetermined or selected voltage difference ΔVA from the default reference voltage DVREF, and the initialization voltage VINT is increased by the predetermined or selected voltage difference ΔVB from the default initialization voltage DVINT, the temperature luminance sensitivity TLS may be decreased from about 25.43% to about 15.11%. Further, in case that the reference voltage VREF is further increased by the predetermined or selected voltage difference ΔVA and the initialization voltage VINT is further increased by the predetermined or selected voltage difference ΔVB, the temperature luminance sensitivity TLS may be further decreased from about 15.11% to about 11.42%.

Figure 11:
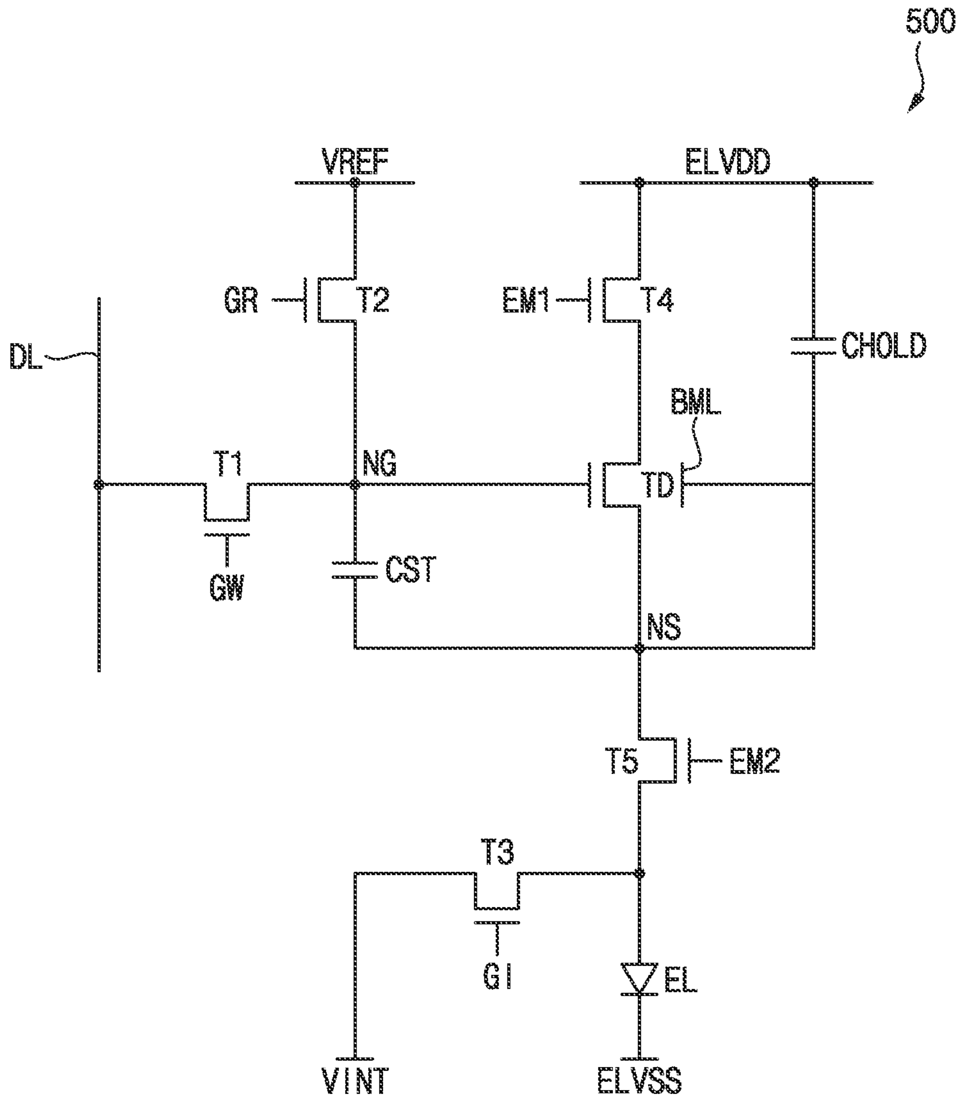
FIG. 11 is a schematic circuit diagram illustrating a pixel included in a display device according to embodiments.

FIG. 11 is a schematic circuit diagram illustrating a pixel included in a display device according to embodiments.

Referring to FIG. 11, a pixel 500 according to embodiments may include a driving transistor TD, a first transistor T1, a second transistor T2, a third transistor T3, a fourth transistor T4, a fifth transistor T5, a storage capacitor CST, a hold capacitor CHOLD and a light emitting element EL.

The driving transistor TD may generate a driving current provided to the light emitting element EL based on a voltage between a gate node NG and a source node NS, or a voltage stored between first and second electrodes of the storage capacitor CST. In some embodiments, the driving transistor TD may include a gate connected to the gate node NG, a drain connected to the fourth transistor T4, and a second terminal connected to the source node NS.

In some embodiments, the gate connected to the gate node NG may be a top gate located above an active layer of the driving transistor TD, and the driving transistor TD may further include a bottom gate BML located below the active layer. For example, the driving transistor TD may have a double gate structure including the top gate and the bottom gate BML. In some embodiments, the bottom gate BML of the driving transistor TD may be referred to as a bottom metal layer. Since the bottom gate BML of the driving transistor TD is connected to the source node NS and the bottom gate BML has a substantially constant voltage by the hold capacitor CHOLD, a driving characteristic of the driving transistor TD may be improved.

The first transistor T1 may transfer a data voltage to the gate node NG in response to a writing signal GW. In some embodiments, the first transistor T1 may include a gate receiving the writing signal GW, a first terminal connected to a data line DL, and a second terminal connected to the gate node NG.

The second transistor T2 may transfer a reference voltage VREF to the gate node NG in response to a reference signal GR. In some embodiments, the second transistor T2 may include a gate receiving the reference signal GR, a first terminal connected to a line transferring the reference voltage VREF, and a second terminal connected to the gate node NG.

The third transistor T3 may transfer an initialization voltage VINT to an anode of the light emitting element EL in response to an initialization signal GI. In some embodiments, the third transistor T3 may include a gate receiving the initialization signal GI, a first terminal connected to the anode of the light emitting element EL, and a second terminal connected to the line transferring the initialization voltage VINT.

The fourth transistor T4 may connect a line transferring a first power supply voltage ELVDD (e.g., a high power supply voltage) to the drain of the driving transistor TD in response to a first emission signal EM1. In some embodiments, the fourth transistor T4 may include a gate receiving the first emission signal EM1, a first terminal connected to the line transferring the first power supply voltage ELVDD, and a second terminal connected to the drain of the driving transistor TD.

The fifth transistor T5 may be connected between the source node NS and the anode of the light emitting element EL, and may connect the source node NS to the anode of the light emitting element EL in response to a second emission signal EM2. In some embodiments, the fifth transistor T5 may include a gate receiving the second emission signal EM2, a first terminal connected to the source node NS, and a second terminal connected to the anode of the light emitting element EL.

The storage capacitor CST may be connected between the gate node NG and the source node NS. In some embodiments, the storage capacitor CST may include a first electrode connected to the gate node NG, and a second electrode connected to the source node NS.

The hold capacitor CHOLD may be connected between the line transferring the first power supply voltage ELVDD and the source node NS. In some embodiments, the hold capacitor CHOLD may include a first electrode connected to the source node NS, and a second electrode connected to the line transferring the first power supply voltage ELVDD.

The light emitting element EL may emit light based on the driving current generated by the driving transistor TD. In some embodiments, the light emitting element EL may be an organic light emitting diode (OLED), but is not limited thereto. In other embodiments, the light emitting element EL may be any suitable light emitting element. For example, the light emitting device EL may be a nano light emitting diode (NED), a quantum dot (QD) light emitting diode, a micro light emitting diode, an inorganic light emitting diode, or any other suitable light emitting element. In some embodiments, the light emitting element EL may include the anode connected to the third and fifth transistors T3 and T5, and a cathode connected to a line transferring a second power supply voltage ELVSS (e.g., a low power supply voltage).

In some embodiments, at least one of the first through fifth transistors T1 through T5 included in the pixel 500 may be implemented as an n-type metal oxide semiconductor (NMOS) transistor, but is not limited thereto. For example, as illustrated in FIG. 11, all of the first through fifth transistors T1 through T5 may be implemented as NMOS transistors. In other embodiments, some or all of the first through fifth transistors T1 through T5 may be implemented as p-type metal oxide semiconductor (PMOS) transistors.

Hereinafter, an example of an operation of the pixel 500 according to embodiments will be described below with reference to FIGS. 11 through 16.

Figure 12:
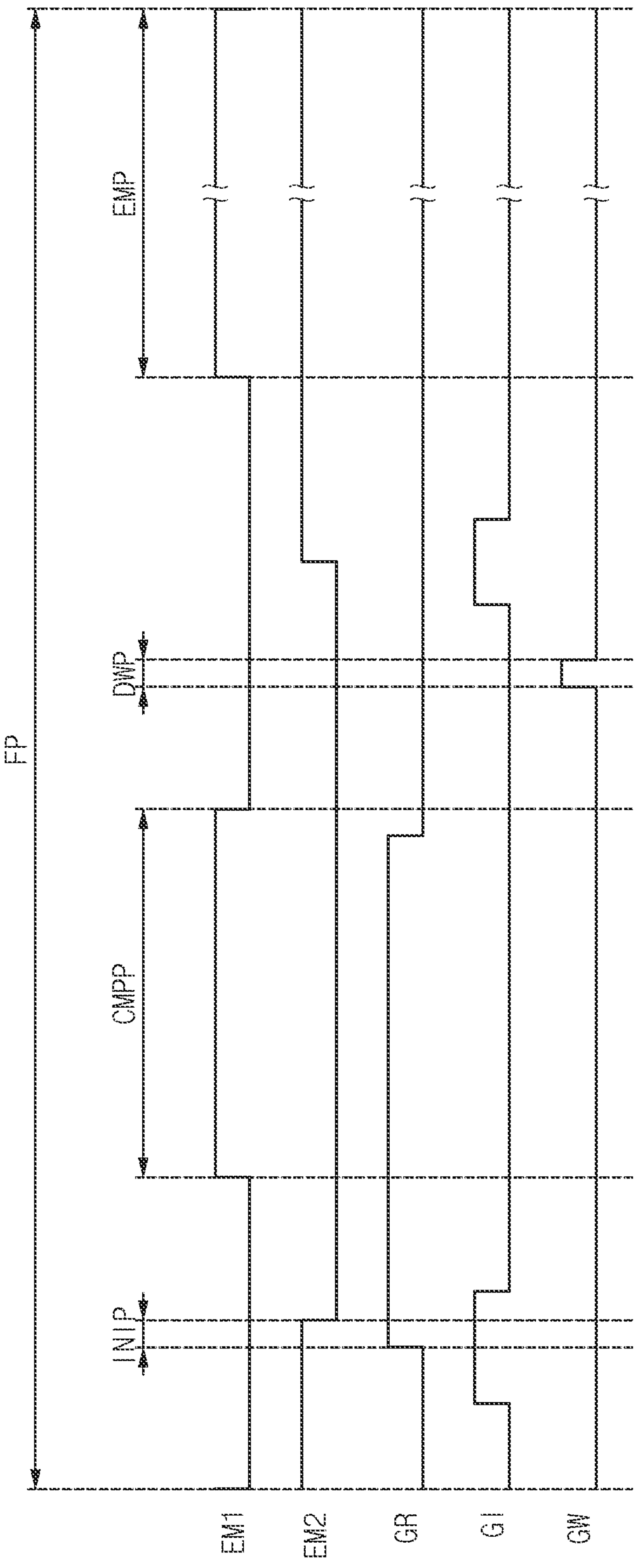
FIG. 12 is a schematic timing diagram for describing an operation of a pixel of FIG. 11.
Figure 13:
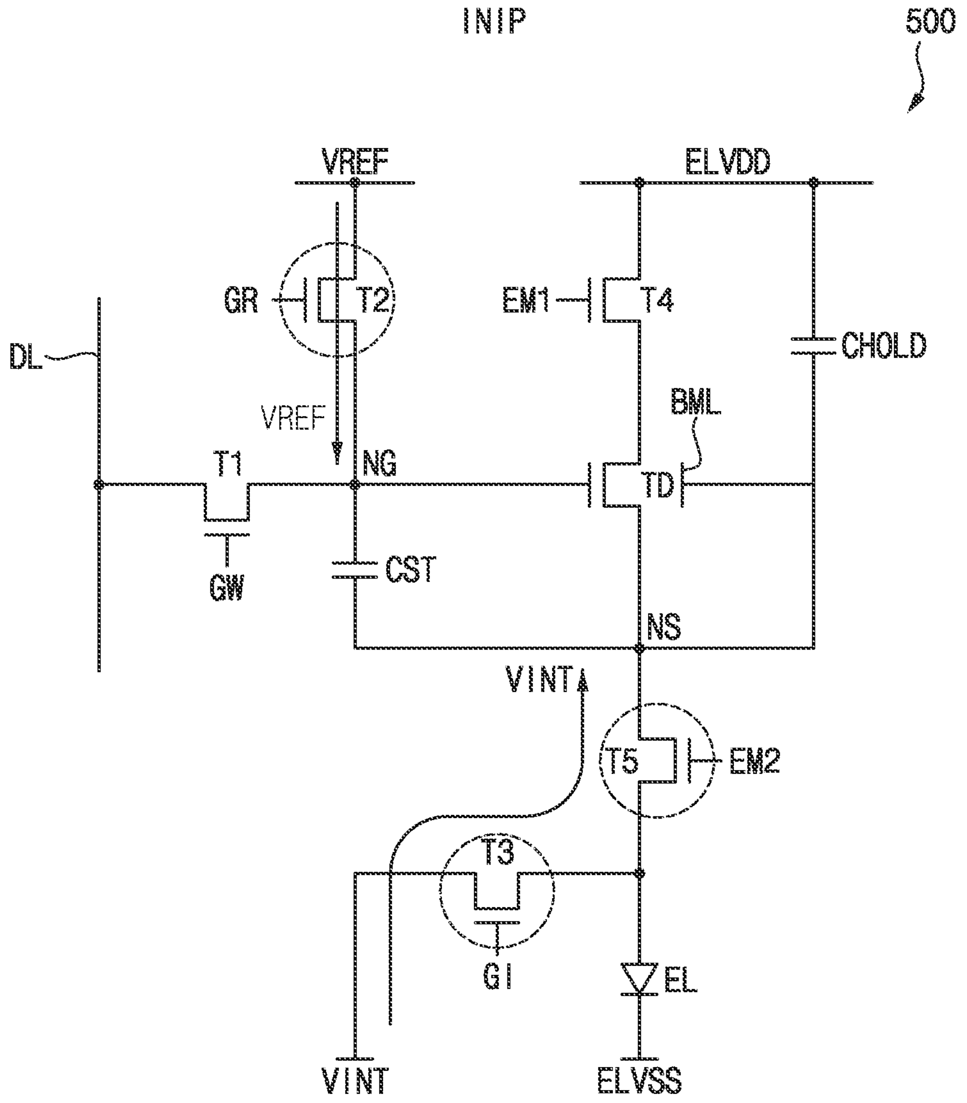
FIG. 13 is a schematic circuit diagram for describing an example of an operation of a pixel of FIG. 11 in an initialization period.
Figure 14:
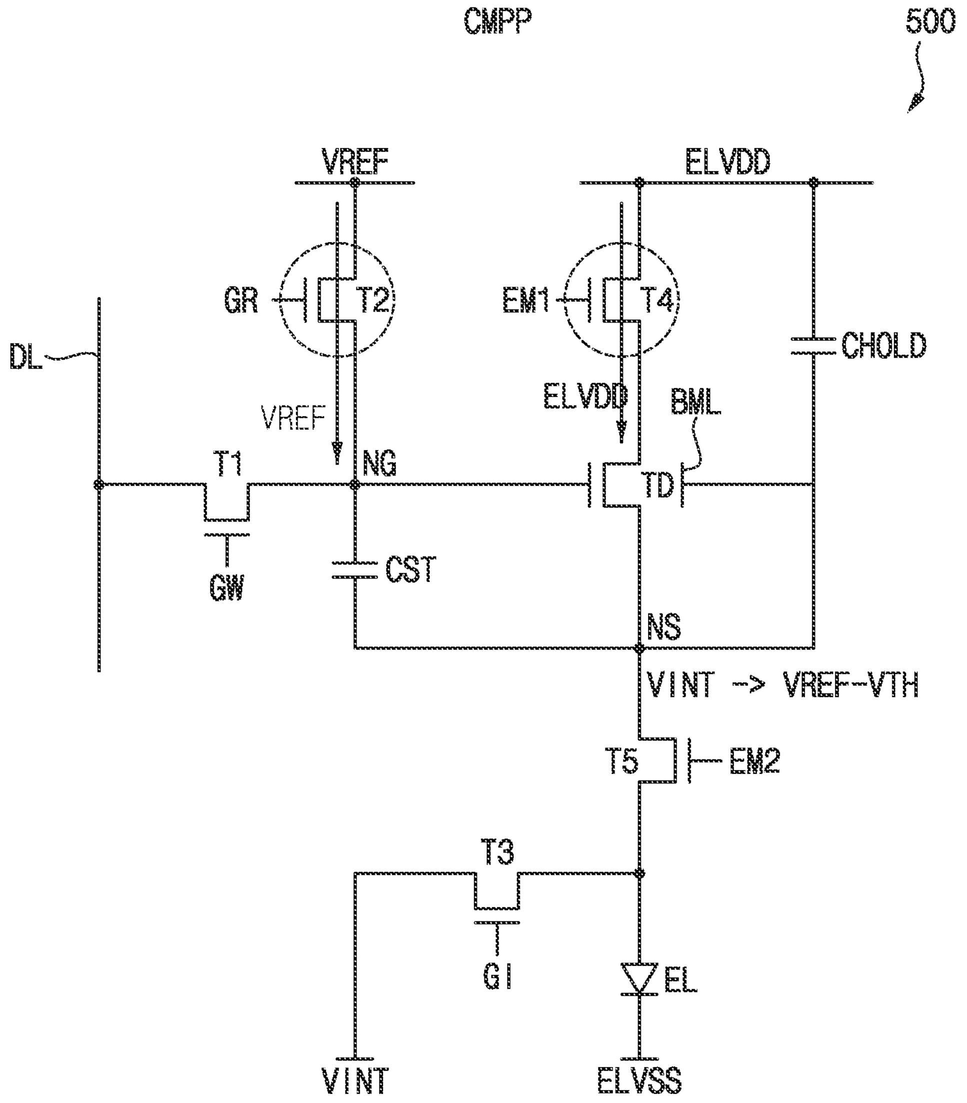
FIG. 14 is a schematic circuit diagram for describing an example of an operation of a pixel of FIG. 11 in a compensation period.
Figure 15:
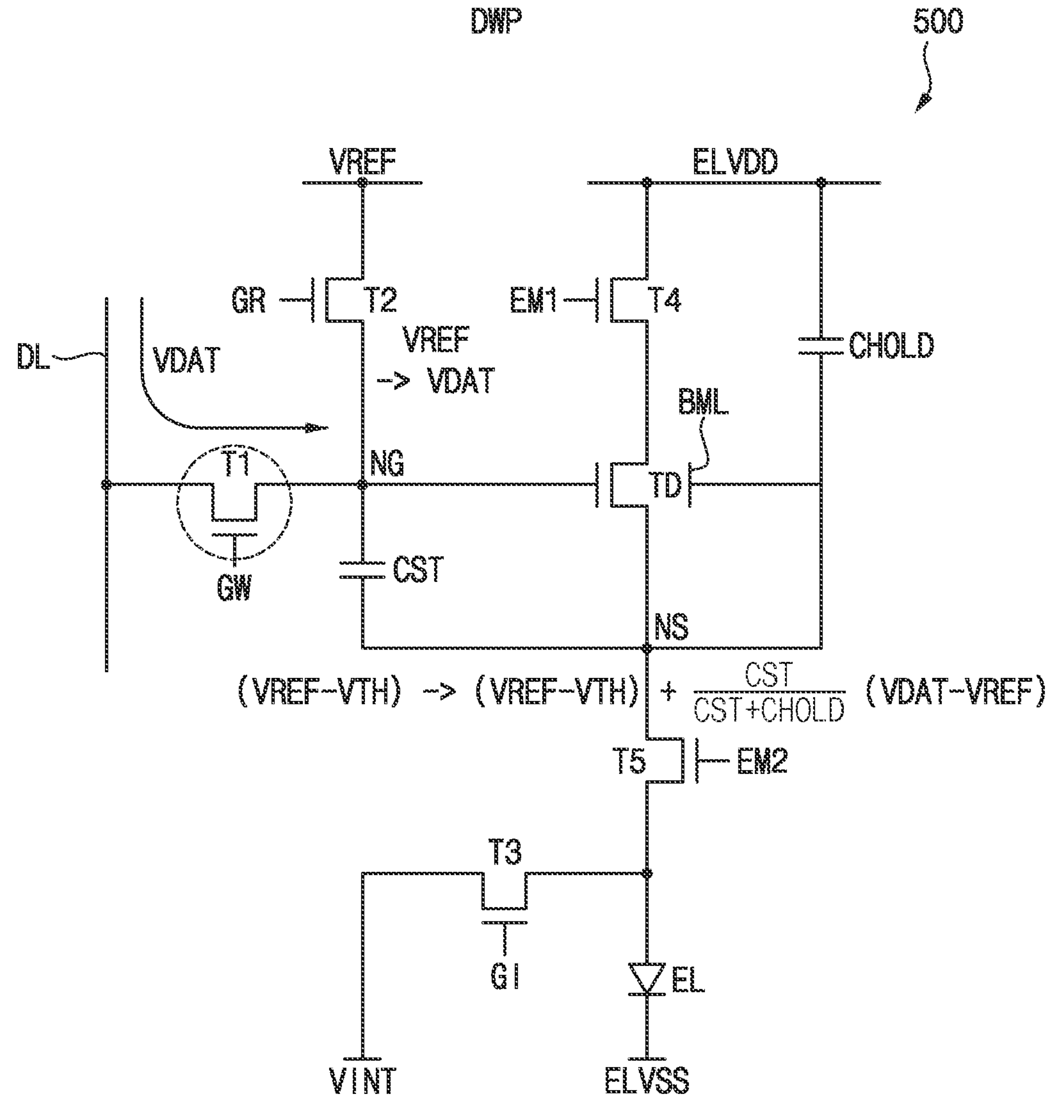
FIG. 15 is a schematic circuit diagram for describing an example of an operation of a pixel of FIG. 11 in a writing period.
Figure 16:
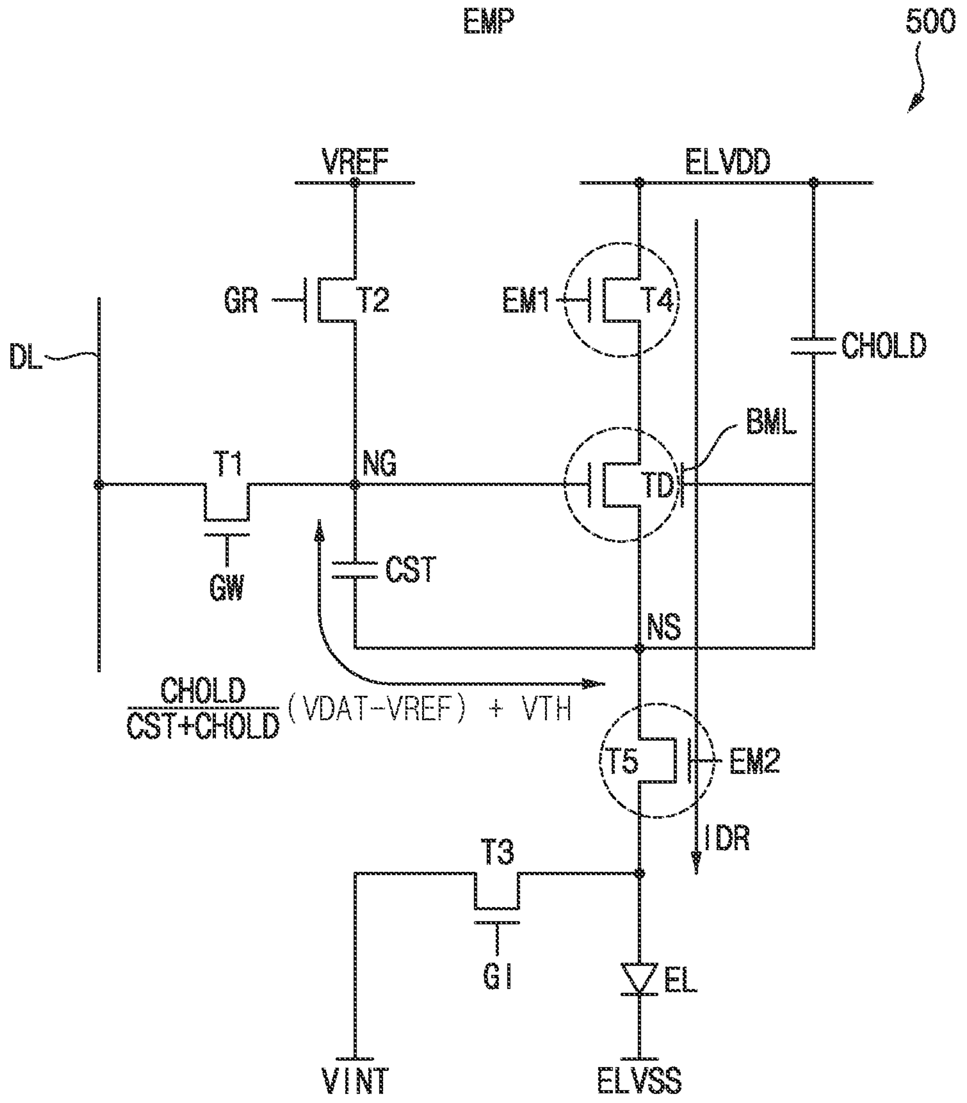
FIG. 16 is a schematic circuit diagram for describing an example of an operation of a pixel of FIG. 11 in an emission period.

FIG. 12 is a schematic timing diagram for describing an operation of a pixel of FIG. 11. FIG. 13 is a schematic circuit diagram for describing an example of an operation of a pixel of FIG. 11 in an initialization period. FIG. 14 is a schematic circuit diagram for describing an example of an operation of a pixel of FIG. 11 in a compensation period. FIG. 15 is a schematic circuit diagram for describing an example of an operation of a pixel of FIG. 11 in a writing period. FIG. 16 is a schematic circuit diagram for describing an example of an operation of a pixel of FIG. 11 in an emission period.

Referring to FIGS. 11 and 12, each frame period FP for the pixel 500 may include an initialization period INIP in which the gate node NG and the source node NS are initialized, a compensation period CMPP in which a threshold voltage of the driving transistor TD is stored the storage capacitor CST, a writing period DWP in which the data voltage is transferred to the gate node NG, and an emission period EMP in which the light emitting element EL emits light.

In the initialization period INIP, the first emission signal EM1 may have a low level, the second emission signal EM2 may have a high level, the reference signal GR may have the high level, the initialization signal GI may have the high level, and the writing signal GW may have the low level. As illustrated in FIG. 13, the second transistor T2 may be turned on in response to the reference signal GR having the high level to apply the reference voltage VREF to the gate node NG. Further, the third transistor T3 may be turned on in response to the initialization signal GI having the high level, the fifth transistor T5 may be turned on in response to the second emission signal EM2 having the high level, and thus the initialization voltage VINT may be applied to the source node NS through the third and fifth transistors T3 and T5. Accordingly, the gate node NG may be initialized based on the reference voltage VREF, and the source node NS may be initialized based on the initialization voltage VINT. Further, the initialization voltage VINT may be applied to the anode of the light emitting element EL, and thus the anode of the light emitting element EL may be initialized based on the initialization voltage VINT.

In the compensation period CMPP, the first emission signal EM1 may have the high level, the second emission signal EM2 may have the low level, the reference signal GR may have the high level, the initialization signal GI may have the low level, and the writing signal GW may have the low level. In some embodiments, as illustrated in FIG. 12, the reference signal GR may be changed to the low level before the compensation period CMPP ends. As illustrated in FIG. 14, the second transistor T2 may be turned on based on the reference signal GR having the high level, and may continue to apply the reference voltage VREF to the gate node NG. The fourth transistor T4 may be turned on based on the first emission signal EM1 having the high level to apply the first power supply voltage ELVDD to the drain of the driving transistor TD, and the fifth transistor T5 may be turned off in response to the second emission signal EM2 having the low level. Thus, the driving transistor TD may be turned on based on the reference voltage VREF applied to its gate, and may operate as a source follower that changes a voltage of its source to a voltage close to the reference voltage VREF. For example, until the threshold voltage VTH of the driving transistor TD is stored in the storage capacitor CST, or until a voltage of the source node NS becomes a voltage VREF-VTH obtained by subtracting the threshold voltage VTH from the reference voltage VREF, the driving transistor TD may be turned on. Thus, the voltage of the source node NS may be changed from the initialization voltage VINT to the voltage VREF-VTH (or a voltage close to the voltage VREF-VTH) obtained by subtracting the threshold voltage VTH from the reference voltage VREF. In a display device according to embodiments, in case that the reference voltage VREF and/or the initialization voltage VINT are increased, the voltage of the source of the driving transistor TD may be increased, a drain-source voltage of the driving transistor TD may be decreased, and a compensation point in the compensation period CMPP may be moved close to an operating point in the emission period EMP.

In the writing period DWP, the first emission signal EM1 may have the low level, the second emission signal EM2 may have the low level, the reference signal GR may have the low level, the initialization signal GI may have the low level, and the writing signal GW may have the high level. As illustrated in FIG. 15, the first transistor T1 may be turned on in response to the writing signal GW having the high level to apply the data voltage VDAT to the gate node NG. Thus, a voltage of the gate node NG may be changed from the reference voltage VREF to the data voltage VDAT by "VDAT-VREF". In case that the voltage of the gate node NG is changed by "VDAT-VREF", the voltage of the source node NS also may be changed by $$\text{``}\frac{CST}{CST + CHOLD}(VDAT - VREF)\text{''}$$

based on the voltage change of the gate node NG and the storage and hold capacitors CST and CHOLD. Accordingly, the voltage of the source node NS may be changed from $$\text{``}(VREF - VTH)\text{''} \text{ to } \text{``}(VREF - VTH) + \frac{CST}{CST + CHOLD}(VDAT - VREF)\text{''}.$$

Accordingly, a gate-source voltage of the driving transistor TD may become $$\text{``}\frac{CHOLD}{CST + CHOLD}(VDAT - VREF) + VTH\text{''}.$$

In the emission period EMP, the first emission signal EM1 may have the high level, the second emission signal EM2 may have the high level, the reference signal GR may have the low level, the initialization signal GI may have the low level, and the writing signal GW may have the low level. As illustrated in FIG. 16, the fourth and fifth transistors T4 and T5 may be turned on in response to the first and second emission signals EM1 and EM2 having the high level, and the driving transistor TD may be turned on based on $$\text{``}\frac{CHOLD}{CST + CHOLD}(VDAT - VREF) + VTH\text{''}$$

stored between the first and second electrodes of the storage capacitor CST to provide the driving current IDR to the light emitting element EL. The light emitting element EL may emit light based on the driving current IDR. In the display device according to embodiments, in case that the reference voltage VREF and/or the initialization voltage VINT are increased, the compensation point in the compensation period CMPP may be moved close to the operating point in the emission period EMP, and an image quality change (e.g., a luminance change and/or a color coordinate change) according to a temperature may be reduced or minimized.

Figure 17:
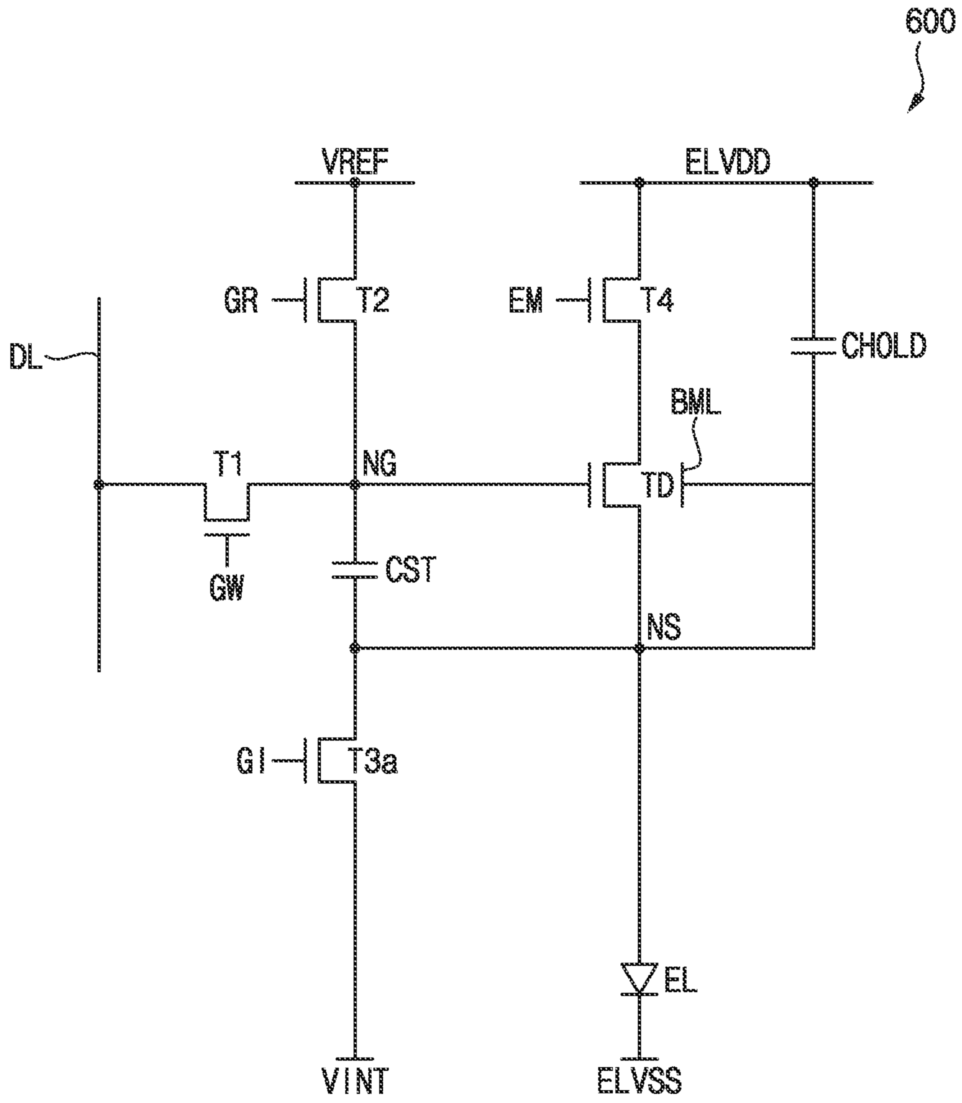
FIG. 17 is a schematic circuit diagram illustrating a pixel included in a display device according to embodiments.
Figure 18:
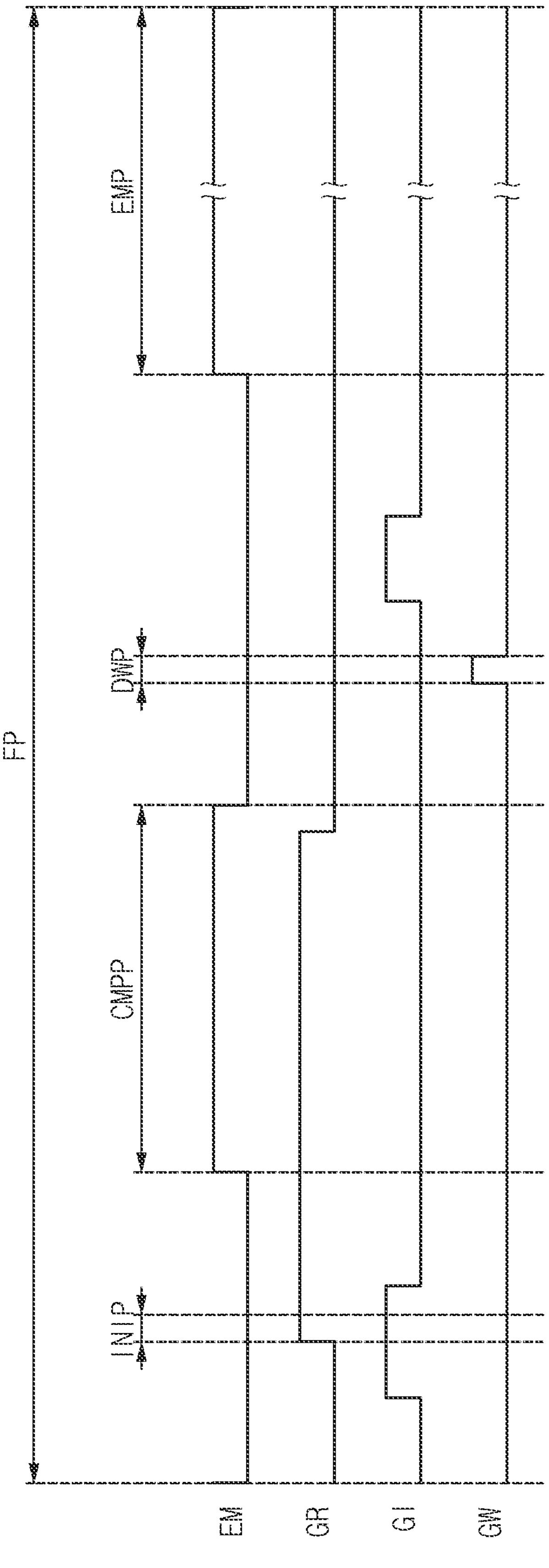
FIG. 18 is a schematic timing diagram for describing an operation of a pixel of FIG. 17.

FIG. 17 is a schematic circuit diagram illustrating a pixel included in a display device according to embodiments, and FIG. 18 is a schematic timing diagram for describing an operation of a pixel of FIG. 17.

Referring to FIG. 17, a pixel 600 according to embodiments may include a driving transistor TD, a first transistor T1, a second transistor T2, a third transistor T3*a*, a fourth transistor T4, a storage capacitor CST, a hold capacitor CHOLD and a light emitting element EL. The pixel 600 of FIG. 17 may have a similar configuration to a pixel 500 of FIG. 11, except that the pixel 600 may not include a fifth transistor, and the third transistor T3*a* may be directly connected to a source node NS. The third transistor T3*a* may transfer an initialization voltage VINT to the source node NS in response to an initialization signal GI. In some embodiments, the third transistor T3*a* may include a gate receiving the initialization signal GI, a first terminal connected to the source node NS, and a second terminal connected to a line transferring the initialization voltage VINT.

Further, a timing diagram of FIG. 18 may be similar to a timing diagram of FIG. 12, except that a second emission signal may not be applied to the pixel 600. For example, the pixel 600 of FIG. 17 may perform an operation similar to that of the pixel 500 of FIG. 11. An emission signal EM illustrated in FIGS. 17 and 18 may correspond to a first emission signal EM1 illustrated in FIGS. 11 and 12.

Figure 19:
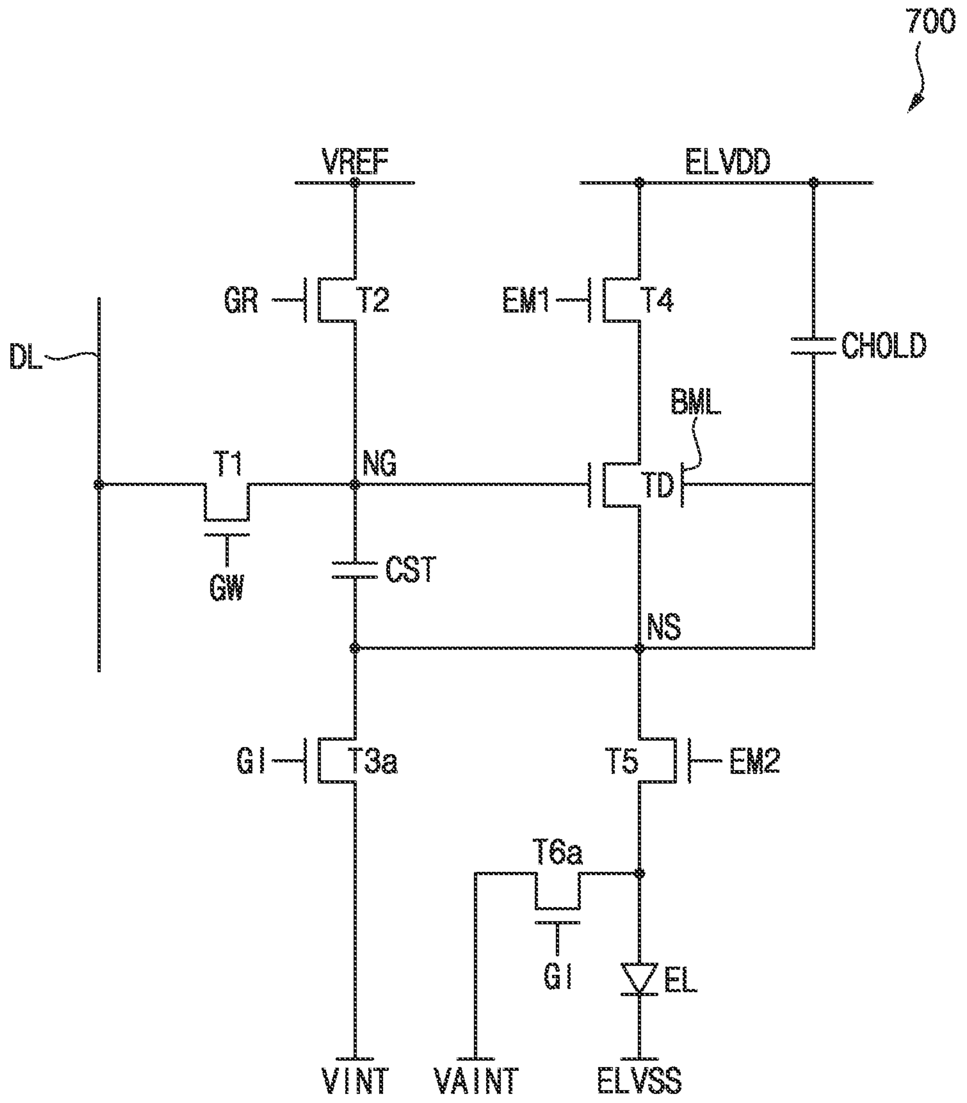
FIG. 19 is a schematic circuit diagram illustrating a pixel included in a display device according to embodiments.
Figure 20:
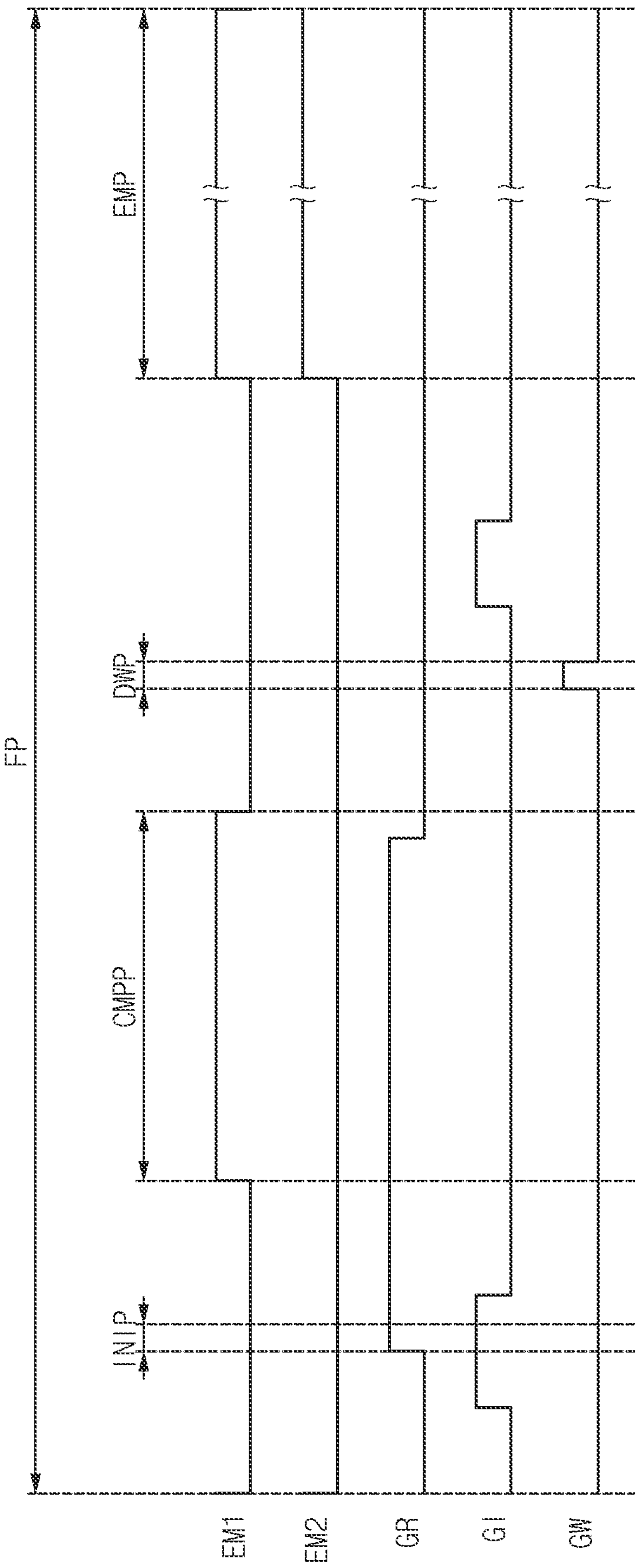
FIG. 20 is a schematic timing diagram for describing an operation of a pixel of FIG. 19.

FIG. 19 is a schematic circuit diagram illustrating a pixel included in a display device according to embodiments, and FIG. 20 is a schematic timing diagram for describing an operation of a pixel of FIG. 19.

Referring to FIG. 19, a pixel 700 according to embodiments may include a driving transistor TD, a first transistor T1, a second transistor T2, a third transistor T3*a*, a fourth transistor T4, a fifth transistor T5, a sixth transistor T6*a*, a storage capacitor CST, a hold capacitor CHOLD and a light emitting element EL. The pixel 700 of FIG. 19 may have a similar configuration to a pixel 500 of FIG. 11, except that the pixel 700 may further include the sixth transistor T6*a*, and the third transistor T3*a* may be directly connected to a source node NS. The third transistor T3*a* may transfer an initialization voltage VINT to the source node NS in response to an initialization signal GI. In some embodiments, the third transistor T3*a* may include a gate receiving the initialization signal GI, a first terminal connected to the source node NS, and a second terminal connected to a line transferring the initialization voltage VINT. Further, the sixth transistor T6*a* may transfer an anode initialization voltage VAINT to an anode of the light emitting element EL in response to the initialization signal GI. In some embodiments, the sixth transistor T6*a* may include a gate receiving the initialization signal GI, a first terminal connected to the anode of the light emitting element EL, and a second terminal connected to a line transferring the anode initialization voltage VAINT.

Further, a timing diagram of FIG. 20 may be similar to a timing diagram of FIG. 12, except that a second emission signal EM2 may have a low level in initialization, compensation and writing periods INIP, CMPP, and DWP, and may have a high level in an emission period EMP. For example, the pixel 700 of FIG. 19 may perform an operation similar to that of the pixel 500 of FIG. 11. In the initialization period INIP, the third transistor T3*a* may transfer the initialization voltage VINT to the source node NS, and the sixth transistor Toa may transfer the anode initialization voltage VAINT to the anode of the light emitting element EL. In some embodiments, as illustrated in FIG. 19, the initialization voltage VINT and the anode initialization voltage VAINT may be different voltages transferred through different lines. In other embodiments, the initialization voltage VINT and the anode initialization voltage VAINT may be the same voltage transferred through the same line.

Figure 21:
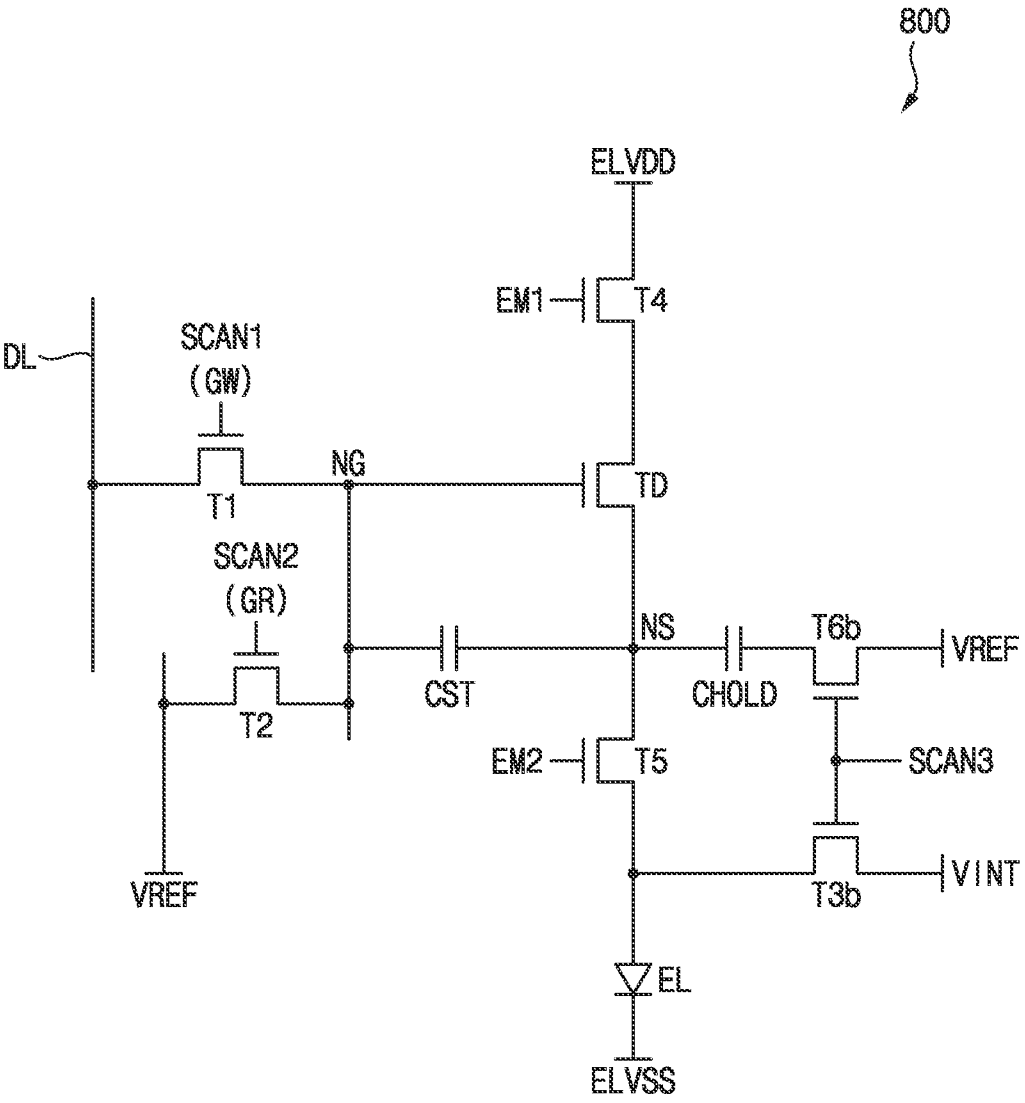
FIG. 21 is a schematic circuit diagram illustrating a pixel included in a display device according to embodiments.
Figure 22:
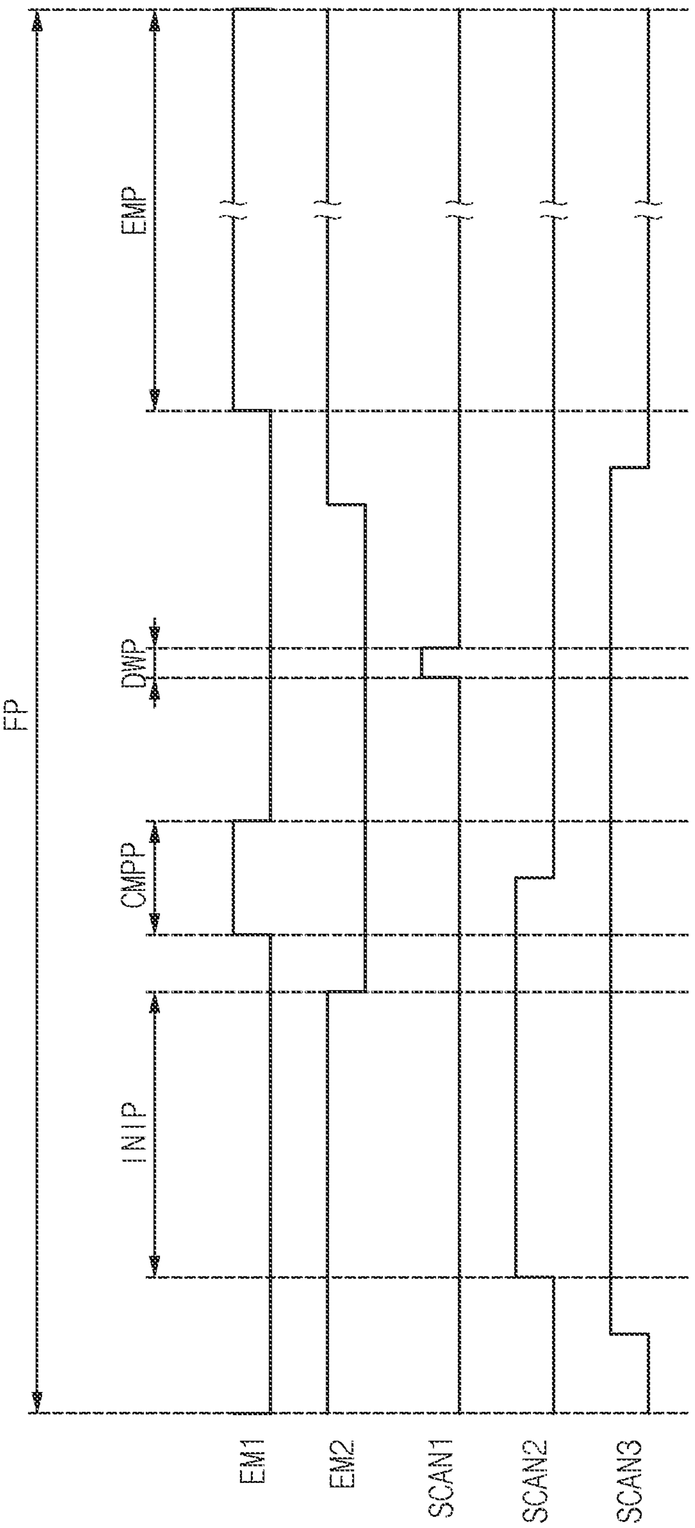
FIG. 22 is a schematic timing diagram for describing an operation of a pixel of FIG. 21.

FIG. 21 is a schematic circuit diagram illustrating a pixel included in a display device according to embodiments, and FIG. 22 is a schematic timing diagram for describing an operation of a pixel of FIG. 21.

Referring to FIG. 21, a pixel 800 according to embodiments may include a driving transistor TD, a first transistor T1, a second transistor T2, a third transistor T3*b*, a fourth transistor T4, a fifth transistor T5, a sixth transistor T6*b*, a storage capacitor CST, a hold capacitor CHOLD and a light emitting element EL. The pixel 800 of FIG. 21 may have a similar configuration to a pixel 500 of FIG. 11, except that the pixel 800 may further include the sixth transistor T6*b*, the hold capacitor CHOLD may be connected to the sixth transistor T6*b*, and the third and sixth transistors T3*b* and T6*b* may receive a third scan signal SCAN3.

The first transistor T1 may receive a first scan signal SCAN1, and the second transistor T2 may receive a second scan signal SCAN2. In some embodiments, the first scan signal SCAN1 may correspond to a writing signal GW, and the second scan signal SCAN2 may correspond to a reference signal GR.

The third transistor T3*b* may transfer an initialization voltage VINT to an anode of the light emitting element EL in response to the third scan signal SCAN3. In some embodiments, the third transistor T3*b* may include a gate receiving the third scan signal SCAN3, a first terminal connected to the anode of the light emitting element EL, and a second terminal connected to a line transferring the initialization voltage VINT.

The hold capacitor CHOLD may include a first electrode connected to the source node NS, and a second electrode. The sixth transistor T6*b* may transfer a reference voltage VREF to the second electrode of the hold capacitor CHOLD in response to the third scan signal SCAN3. In some embodiments, the sixth transistor T6*b* may include a gate receiving the third scan signal SCAN3, a first terminal connected to the second electrode of the hold capacitor CHOLD, and a second terminal connected to a line transferring the reference voltage VREF.

Referring to FIG. 22, a first emission signal EM1 may have a high level in a compensation period CMPP and an emission period EMP, and may have a low level in an initialization period INIP and a writing period DWP. Further, a second emission signal EM2 may have the high level in the initialization period INIP and the emission period EMP, and may have the low level in the compensation period CMPP and the writing period DWP. Further, the first scan signal SCAN1 may have the high level in the writing period DWP, and may have the low level in the initialization period INIP, the compensation period CMPP and the emission period EMP. The second scan signal SCAN2 may have the high level in at least a portion of the initialization period INIP and the compensation period CMPP, and may have the low level in the writing period DWP and the emission period EMP. Further, the third scan signal SCAN3 may have the high level in the initialization period INIP, the compensation period CMPP and the writing period DWP, and may have the low level in the emission period EMP.

In the initialization period INIP, the second, third, fifth and sixth transistors T2, T3*b*, T5 and T6*b* may be turned on, a gate node NG may be initialized based on the reference voltage VREF, and the source node NS and the anode of the light emitting element EL may be initialized based on the initialization voltage VINT. In the compensation period CMPP, the second, third, fourth and sixth transistors T2, T3*b*, T4 and T6*b* may be turned on, and a threshold voltage compensation operation for the driving transistor TD may be performed in a source follower manner. In the writing period DWP, the first, third and sixth transistors T1, T3*b* and T6*b* may be turned on, and a data voltage may be applied to the gate node NG. In the emission period EMP, the fourth and fifth transistors T4 and T5 may be turned on, the driving transistor TD may generate a driving current, and the light emitting element EL may emit light based on the driving current.

Although FIG. 11 illustrates an example of a pixel 500 having a 6T2C structure, FIG. 17 illustrates an example of a pixel 600 having a 5T2C structure, FIG. 19 illustrates an example of a pixel 700 having a 7T2C structure, and FIG. 21 illustrates another example of a pixel 800 having a 7T2C structure, a display device according to embodiments may include any pixel that performs a threshold voltage compensation operation in a source follower manner.

Figure 23:
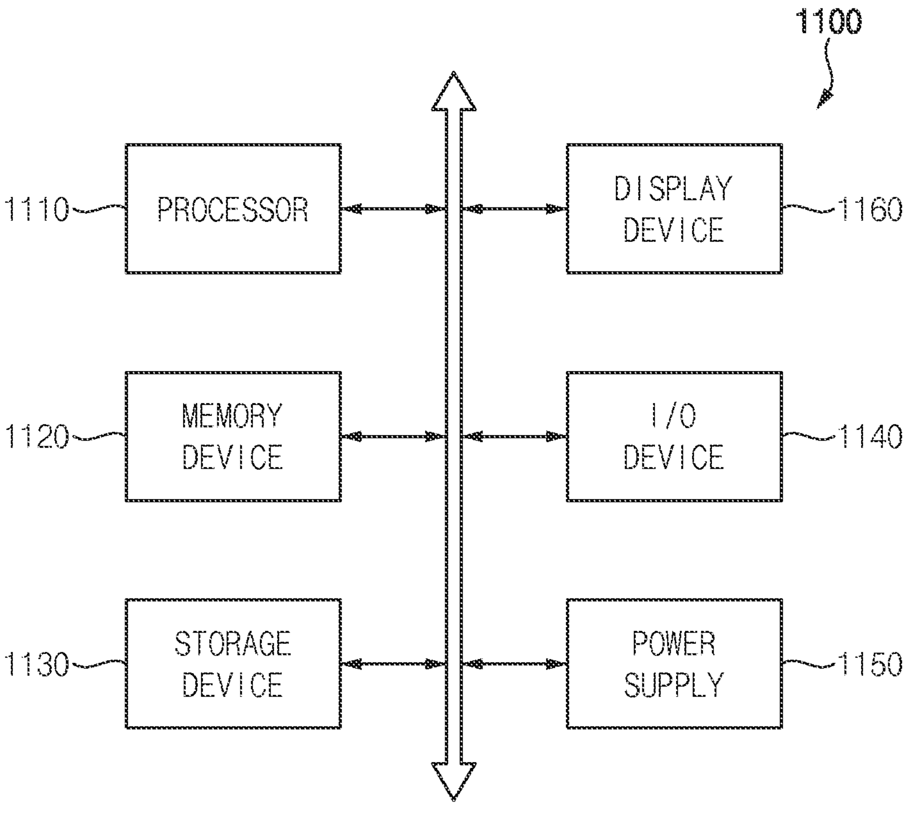
FIG. 23 is a schematic block diagram illustrating an electronic device including a display device according to embodiments.

FIG. 23 is a schematic block diagram illustrating an electronic device including a display device according to embodiments.

Referring to FIG. 23, an electronic device 1100 may include a processor 1110, a memory device 1120, a storage device 1130, an input/output (I/O) device 1140, a power supply 1150, and a display device 1160. The electronic device 1100 may further include ports for communicating with a video card, a sound card, a memory card, a universal serial bus (USB) device, other electric devices, etc.

The processor 1110 may perform various computing functions or tasks. The processor 1110 may be an application processor (AP), a microprocessor, a central processing unit (CPU), etc. The processor 1110 may be connected to other components via an address bus, a control bus, a data bus, etc. Further, in some embodiments, the processor 1110 may be further connected to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be connected to other components through the buses or other communication links.

In the display device 1160, in an initialization period, a reference voltage may be applied to a gate of a driving transistor of each pixel, and an initialization voltage may be applied to a source of the driving transistor. In a compensation period, a threshold voltage compensation operation for the driving transistor may be performed based on the reference voltage in a source follower manner. Further, at least one of the reference voltage and the initialization voltage may be adjusted according to a brightness value. Accordingly, a compensation point of the driving transistor in the compensation period may be moved to an operating point of the driving transistor in an emission period, and an image quality change (e.g., a luminance change and/or a color coordinate change) according to a temperature may be reduced or minimized.

The disclosure may be applied to any display device 1160, and any electronic device 1100 including the display device 1160. For example, the disclosure may be applied to a smart phone, a wearable electronic device, a tablet computer, a mobile phone, a television (TV), a digital TV, a 3D TV, a personal computer (PC), a home appliance, a laptop computer, a personal digital assistant (PDA), a portable multimedia player (PMP), a digital camera, a music player, a portable game console, a navigation device, etc.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure.

What is claimed is:

1. A display device, comprising:

a display panel including a pixel; and a panel driver configured to drive the display panel, to receive a brightness value, and to generate a reference voltage and an initialization voltage, wherein the pixel includes:

a driving transistor including a gate electrically connected to a gate node, and a source electrically connected to a source node;

a storage capacitor including a first electrode electrically connected to the gate node, and a second electrode electrically connected to the source node; and a light emitting element including an anode electrically connected to the source node, in an initialization period, the reference voltage is applied to the gate of the driving transistor, and the initialization voltage is applied to the source of the driving transistor, in a compensation period, the driving transistor is turned on based on the reference voltage such that a threshold voltage of the driving transistor is stored between the first and second electrodes of the storage capacitor, and the panel driver adjusts at least one of the reference voltage and the initialization voltage according to the brightness value.

2. The display device of claim 1, wherein the panel driver increases at least one of the reference voltage and the initialization voltage as the brightness value decreases.

3. The display device of claim 2, wherein the panel driver decreases a drain-source voltage of the driving transistor in the compensation period by increasing at least one of the reference voltage and the initialization voltage.

4. The display device of claim 3, wherein the panel driver moves a compensation point of the driving transistor in the compensation period to an operating point of the driving transistor in an emission period by decreasing the drain-source voltage of the driving transistor in the compensation period.

5. The display device of claim 1, wherein in case that the brightness value is between a reference brightness value and a maximum brightness value, the panel driver adjusts a luminance of the display panel according to the brightness value by adjusting a data voltage applied to the display panel, and in case that the brightness value is between a minimum brightness value and the reference brightness value, the panel driver adjusts the luminance of the display panel according to the brightness value by adjusting a length of an emission period within each frame period.

6. The display device of claim 5, wherein in case that the brightness value is between the reference brightness value and the maximum brightness value, the panel driver determines at least one of the reference voltage and the initialization voltage as a default voltage, and in case that the brightness value is between a minimum brightness value and the reference brightness value, the panel driver increases at least one of the reference voltage and the initialization voltage as the brightness value decreases.

7. The display device of claim 1, wherein the pixel further includes:

a first transistor configured to transfer a data voltage to the gate node in response to a writing signal;

a second transistor configured to transfer the reference voltage to the gate node in response to a reference signal;

a third transistor configured to transfer the initialization voltage to the anode of the light emitting element in response to an initialization signal;

a fourth transistor configured to electrically connect a line transferring a first power supply voltage to a drain of the driving transistor in response to a first emission signal;

a fifth transistor electrically connected between the source node and the anode of the light emitting element, and configured to electrically connect the source node to the anode of the light emitting element in response to a second emission signal; and a hold capacitor including a first electrode electrically connected to the source node, and a second electrode electrically connected to the line transferring the first power supply voltage.

8. The display device of claim 7, wherein the first transistor includes:

a gate receiving the writing signal;

a first terminal electrically connected to a data line; and a second terminal electrically connected to the gate node, the second transistor includes:

a gate receiving the reference signal;

a first terminal electrically connected to a line transferring the reference voltage; and a second terminal electrically connected to the gate node, the third transistor includes:

a gate receiving the initialization signal;

a first terminal electrically connected to the anode of the light emitting element; and a second terminal electrically connected to a line transferring the initialization voltage, the fourth transistor includes:

a gate receiving the first emission signal;

a first terminal electrically connected to the line transferring the first power supply voltage; and a second terminal electrically connected to the drain of the driving transistor, and the fifth transistor includes:

a gate receiving the second emission signal;

a first terminal electrically connected to the source node; and a second terminal electrically connected to the anode of the light emitting element.

9. The display device of claim 7, wherein the driving transistor further includes a bottom gate electrically connected to the source node.

10. The display device of claim 1, wherein the pixel further includes:

a first transistor configured to transfer a data voltage to the gate node in response to a writing signal;

a second transistor configured to transfer the reference voltage to the gate node in response to a reference signal;

a third transistor configured to transfer the initialization voltage to the source node in response to an initialization signal;

a fourth transistor configured to electrically connect a line transferring a first power supply voltage to a drain of the driving transistor in response to an emission signal; and a hold capacitor including a first electrode electrically connected to the source node, and a second electrode electrically connected to the line transferring the first power supply voltage.

11. The display device of claim 10, wherein the first transistor includes:

a gate receiving the writing signal;

a first terminal electrically connected to a data line; and a second terminal electrically connected to the gate node, the second transistor includes:

a gate receiving the reference signal;

a first terminal electrically connected to a line transferring the reference voltage; and a second terminal electrically connected to the gate node, the third transistor includes:

a gate receiving the initialization signal;

a first terminal electrically connected to the source node; and a second terminal electrically connected to a line transferring the initialization voltage, and the fourth transistor includes:

a gate receiving the emission signal;

a first terminal electrically connected to the line transferring the first power supply voltage; and a second terminal electrically connected to the drain of the driving transistor.

12. The display device of claim 1, wherein the pixel further includes:

a first transistor configured to transfer a data voltage to the gate node in response to a writing signal;

a second transistor configured to transfer the reference voltage to the gate node in response to a reference signal;

a third transistor configured to transfer the initialization voltage to the source node in response to an initialization signal;

a fourth transistor configured to electrically connect a line transferring a first power supply voltage to a drain of the driving transistor in response to a first emission signal;

a fifth transistor electrically connected between the source node and the anode of the light emitting element, and configured to electrically connect the source node to the anode of the light emitting element in response to a second emission signal;

a sixth transistor configured to transfer an anode initialization voltage to the anode of the light emitting element in response to the initialization signal; and a hold capacitor including a first electrode electrically connected to the source node, and a second electrode electrically connected to the line transferring the first power supply voltage.

13. The display device of claim 12, wherein the first transistor includes:

a gate receiving the writing signal;

a first terminal electrically connected to a data line; and a second terminal electrically connected to the gate node, the second transistor includes:

a gate receiving the reference signal;

a first terminal electrically connected to a line transferring the reference voltage; and a second terminal electrically connected to the gate node, the third transistor includes:

a gate receiving the initialization signal;

a first terminal electrically connected to the source node; and a second terminal electrically connected to a line transferring the initialization voltage, the fourth transistor includes:

a gate receiving the first emission signal;

a first terminal electrically connected to the line transferring the first power supply voltage; and a second terminal electrically connected to the drain of the driving transistor, the fifth transistor includes:

a gate receiving the second emission signal;

a first terminal electrically connected to the source node; and a second terminal electrically connected to the anode of the light emitting element, and the sixth transistor includes:

a gate receiving the initialization signal;

a first terminal electrically connected to the anode of the light emitting element; and a second terminal electrically connected to a line transferring the anode initialization voltage.

14. The display device of claim 1, wherein the pixel further includes:

a first transistor configured to transfer a data voltage to the gate node in response to a first scan signal;

a second transistor configured to transfer the reference voltage to the gate node in response to a second scan signal;

a third transistor configured to transfer the initialization voltage to the anode of the light emitting element in response to a third scan signal;

a fourth transistor configured to electrically connect a line transferring a first power supply voltage to a drain of the driving transistor in response to a first emission signal;

a fifth transistor electrically connected between the source node and the anode of the light emitting element, and configured to electrically connect the source node to the anode of the light emitting element in response to a second emission signal;

a hold capacitor including a first electrode electrically connected to the source node, and a second electrode; and a sixth transistor configured to transfer the reference voltage to the second electrode of the hold capacitor in response to the third scan signal.

15. The display device of claim 14, wherein the first transistor includes:

a gate receiving the first scan signal;

a first terminal electrically connected to a data line; and a second terminal electrically connected to the gate node, the second transistor includes:

a gate receiving the second scan signal;

a first terminal electrically connected to a line transferring the reference voltage; and a second terminal electrically connected to the gate node, the third transistor includes:

a gate receiving the third scan signal;

a first terminal electrically connected to the anode of the light emitting element; and a second terminal electrically connected to a line transferring the initialization voltage, the fourth transistor includes:

a gate receiving the first emission signal;

a first terminal electrically connected to the line transferring the first power supply voltage; and a second terminal electrically connected to the drain of the driving transistor, the fifth transistor includes:

a gate receiving the second emission signal;

a first terminal electrically connected to the source node; and a second terminal electrically connected to the anode of the light emitting element, and the sixth transistor includes:

a gate receiving the third scan signal;

a first terminal electrically connected to the second electrode of the hold capacitor; and a second terminal electrically connected to a line transferring the reference voltage.

16. A display device, comprising:

a display panel including a pixel; and a panel driver configured to drive the display panel, to receive a brightness value, and to generate a reference voltage and an initialization voltage, wherein the pixel includes:

a driving transistor including a gate electrically connected to a gate node, a drain, and a source electrically connected to a source node;

a first transistor configured to transfer a data voltage to the gate node in response to a writing signal;

a second transistor configured to transfer the reference voltage to the gate node in response to a reference signal;

a third transistor configured to transfer the initialization voltage to an anode of a light emitting element in response to an initialization signal;

a fourth transistor configured to electrically connect a line transferring a first power supply voltage to the drain of the driving transistor in response to a first emission signal;

a fifth transistor configured to electrically connect the source node to the anode of the light emitting element in response to a second emission signal;

a storage capacitor including a first electrode electrically connected to the gate node, and a second electrode electrically connected to the source node;

a hold capacitor including a first electrode electrically connected to the source node, and a second electrode electrically connected to the line transferring the first power supply voltage; and a light emitting element including an anode electrically connected to the source node, and a cathode electrically connected to a line transferring a second power supply voltage, in an initialization period, the reference voltage is applied to the gate of the driving transistor through the second transistor, and the initialization voltage is applied to the source of the driving transistor through the third transistor and the fifth transistor, in a compensation period, the first power supply voltage is applied to the drain of the driving transistor through the fourth transistor, and the driving transistor is turned on based on the reference voltage such that a threshold voltage of the driving transistor is stored between the first and second electrodes of the storage capacitor, and the panel driver adjusts at least one of the reference voltage and the initialization voltage according to the brightness value.

17. The display device of claim 16, wherein the panel driver increases at least one of the reference voltage and the initialization voltage as the brightness value decreases.

18. The display device of claim 16, wherein in case that the brightness value is between a reference brightness value and a maximum brightness value, the panel driver determines at least one of the reference voltage and the initialization voltage as a default voltage, and in case that the brightness value is between a minimum brightness value and the reference brightness value, the panel driver increases at least one of the reference voltage and the initialization voltage as the brightness value decreases.

19. An electronic device, comprising:

a processor configured to provide a brightness value;

a display panel including a pixel; and a panel driver configured to drive the display panel, to receive the brightness value from the processor, and to generate a reference voltage and an initialization voltage, wherein the pixel includes:

a driving transistor including a gate electrically connected to a gate node, and a source electrically connected to a source node;

a storage capacitor including a first electrode electrically connected to the gate node, and a second electrode electrically connected to the source node; and a light emitting element including an anode electrically connected to the source node, in an initialization period, the reference voltage is applied to the gate of the driving transistor, and the initialization voltage is applied to the source of the driving transistor, in a compensation period, the driving transistor is turned on based on the reference voltage such that a threshold voltage of the driving transistor is stored between the first and second electrodes of the storage capacitor, and the panel driver adjusts both the reference voltage and the initialization voltage according to the brightness value.

20. The electronic device of claim 19, wherein in case that the brightness value is between a reference brightness value and a maximum brightness value, the panel driver determines the reference voltage and the initialization voltage as a default reference voltage and a default initialization voltage, respectively, and in case that the brightness value is between a minimum brightness value and the reference brightness value, as the brightness value decreases, the panel driver increases the reference voltage, and increases the initialization voltage.

* * * * *